(12) United States Patent
Ikeuchi et al.

(10) Patent No.: US 8,142,371 B2
(45) Date of Patent: Mar. 27, 2012

(54) WALKING ASSIST DEVICE

(75) Inventors: Yasushi Ikeuchi, Wako (JP); Eiji Ninomiya, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 506 days.

(21) Appl. No.: 12/481,221

(22) Filed: Jun. 9, 2009

(65) Prior Publication Data

US 2009/0312155 A1 Dec. 17, 2009

(30) Foreign Application Priority Data

Jun. 11, 2008 (JP) ................................. 2008-153300

(51) Int. Cl.
*A61H 1/00* (2006.01)
(52) U.S. Cl. .................... 601/5; 601/23; 601/35; 602/23
(58) Field of Classification Search ................ 601/5, 23, 601/33, 34, 35; 602/16, 19, 23, 26; 482/51, 482/66, 74–79; 623/24, 27, 31
See application file for complete search history.

(56) References Cited

U.S. PATENT DOCUMENTS

| | | | | |
|---|---|---|---|---|
| 5,476,441 A * | 12/1995 | Durfee et al. | .................... | 602/23 |
| 5,658,242 A * | 8/1997 | McKay et al. | .................... | 602/16 |
| 6,666,796 B1 * | 12/2003 | MacCready, Jr. | ................ | 482/51 |
| 7,828,755 B2 * | 11/2010 | Ikeuchi | .............................. | 601/5 |
| 7,963,932 B2 * | 6/2011 | Ashihara et al. | .................. | 601/5 |
| 2006/0276728 A1 * | 12/2006 | Ashihara et al. | .................. | 601/5 |
| 2009/0036815 A1 * | 2/2009 | Ido | ................................. | 602/23 |

FOREIGN PATENT DOCUMENTS

| | | |
|---|---|---|
| JP | 2007-054616 | 3/2007 |
| JP | 2007-330299 | 12/2007 |

* cited by examiner

*Primary Examiner* — Quang D Thanh
(74) *Attorney, Agent, or Firm* — Rankin, Hill & Clark LLP

(57) ABSTRACT

A power transmission system, which transmits a driving force from a rotary actuator to a third joint of a leg link, applies a driving torque to the third joint from an output shaft of the rotary actuator via a driving crank arm, a connecting rod, and a driven crank arm. A translational force (rod transmitting force) generated at the connecting rod in the longitudinal direction thereof is measured on the basis of an output of a force sensor fixed to the connecting rod. With the rod transmitting force or a driving torque applied to the third joint by the rod transmitting force as a controlled variable, the driving force of the rotary actuator is feedback-controlled according to the measured value of the rod transmitting force and a desired value of the controlled variable so that the controlled variable coincides with the desired value.

5 Claims, 9 Drawing Sheets

WALKING ASSIST DEVICE

BACKGROUND OF THE INVENTION

1. Field of the Invention

The present invention relates to a walking assist device for assisting a user (person) in walking.

2. Related Background Art

Conventionally, the applicant of the present application proposed this type of walking assist device, for example, in Japanese Patent Application Laid-Open No. 2007-54616 (hereinafter, referred to as Patent Document 1) or Japanese Patent Application Laid-Open No. 2007-330299 (hereinafter, referred to as Patent Document 2).

These Patent Documents 1 and 2 disclose a walking assist device including a seat member on which a user is seated in a straddling manner, a pair of left and right foot attachment portions fitted to the left and right feet of the user, respectively, and a pair of left and right leg links interconnecting the seat member and the left and right foot attachment portions, respectively.

In this walking assist device, each leg link includes a thigh frame extending from the seat member via a first joint (hip joint), a crus frame extending from the foot attachment portion via a second joint (ankle joint), and a third joint (knee joint) that interconnects the thigh frame and the crus frame so that the frames freely bend and stretch between the first joint and the second joint. Moreover, an electric motor for driving the third joint is mounted at an end of the thigh frame on the first joint side of each leg link. Further, in a state where the foot attachment portion is in contact with the ground, the electric motor applies a driving torque to the third joint of the leg link in the stretching direction of the leg link. This causes a lifting force to be applied to the user from the seat member and consequently the walking assist device bears a part of the weight of the user.

In this instance, the walking assist device controls the motion thereof as described below. Specifically, a desired total lifting force as a total supporting force (translational force), which is required to support a part of the weight of the user and the weight of the walking assist device on the floor, is distributed to the leg links at a ratio based on the treading forces of the legs of the user measured from the outputs of treading force measurement force sensors provided on the foot attachment portions. This distribution determines the desired values of the supporting forces applied to the leg links from the floor side (the desired shares of the leg links of the desired total lifting force). In this case, the desired values of the supporting forces of the leg links are determined so that the proportion between the desired values of the supporting forces of the left and right leg links is the same as the proportion between the treading forces of the left and right legs of the user. Moreover, supporting forces actually acting on the leg links from the floor side are measured from the outputs of supporting force measurement force sensors, each of which is interposed between the crus frame and the second joint of the corresponding leg link. Further, an output torque of the electric motor is feedback-controlled for each leg link so that a measured value of the supporting force coincides with the desired value. This allows the output torque of each electric motor to be controlled so that the desired lifting force acts on the user (a translational force supporting a part of the weight of the user) from the seat member.

The above conventional walking assist device, however, controls the electric motor in such a way as to directly achieve matching between the desired value and the value of the supporting force measured from the output of the supporting force measurement force sensor interposed between the crus frame and the second joint of each leg link and therefore has a problem described below.

Specifically, the magnitude of the supporting forces acting or the leg links from the floor side is at the maximum equal to the magnitude of the gravity acting on the combined weight, namely the weight of the entire walking assist device plus a part of the weight of the user. On the other hand, the magnitude of the supporting force is almost "zero" in a state where the leg link is a free leg. This requires a wide range (range width) of values of the supporting force required to be measured from the output of the supporting force measurement force sensor. Therefore, it is difficult to measure the supporting force with high resolution and high accuracy.

Further, the supporting force measurement force sensors are provided at places near the lower ends of the leg links. Moreover, the maximum value of the magnitude of the supporting forces acting on the supporting force measurement force sensors becomes so large as to be equal to the magnitude of the gravity acting on the combined weight, namely the weight of the entire walking assist device plus a part of the weight of the user, as described above. Accordingly, the supporting force measurement force sensors are easily affected by forces in the lateral direction (shear direction) due to deformation of the leg link or the like. Therefore, an interference of the forces in the lateral direction easily decreases the measuring accuracy of the supporting forces required for controlling the lifting force (the supporting forces substantially in the vertical direction). Further, the lower ends of the leg links are widely movable relative to the seat member and therefore often come into contact with other objects. These contacts are also causes of decreasing the measurement accuracy of the supporting forces.

The decrease in the measurement accuracy of the supporting forces could lead to inappropriate driving torques, which are applied to the third joints of the leg links by the electric motors, for applying the desired lifting force to the user from the seat member. In another case, the decrease in the measurement accuracy could lead to a difference between the actual lifting force and the desired lifting force, which gives discomfort to the user.

SUMMARY OF THE INVENTION

The present invention has been made in view of the above background, and therefore it is an object of the present invention to provide a walking assist device having a lifting force transmitting portion that applies an upward lifting force to the trunk of a user, the walking assist device capable of stably applying a desired lifting force to the user without directly measuring supporting forces acting on the leg links from the floor side.

To achieve the above object, the present invention provides a walking assist device comprising: a lifting force transmitting portion which is put in contact with the trunk of a user so as to allow an upward lifting force to be applied to the trunk of the user; a pair of left and right foot attachment portions fitted to the feet of the legs of the user; and a pair of left and right leg links connecting the foot attachment portions to the lifting force transmitting portion, respectively, each of the leg links including a thigh frame extending from the lifting force transmitting portion via a first joint, a crus frame extending from each foot attachment portion via a second joint, and a third joint that interconnects the thigh frame and the crus frame so that the frames freely bend and stretch and each of the leg links being provided with a rotary actuator mounted on the thigh frame and with a power transmission system which transmits a driving force of the rotary actuator to the third joint to apply a driving torque around a joint axis of the third joint thereto, wherein the power transmission system includes a driving crank arm fixed coaxially with an output shaft of the rotary actuator, a driven crank arm fixed to the crus frame coaxially with the joint axis of the third joint, and a connecting rod pivotally attached to the driving crank arm and to the driven crank arm at one end and the other end; and wherein each of the leg links includes: a rod transmitting force measuring means which measures a rod transmitting force, which is a translational force acting on the connecting rod in the longitudinal direction thereof according to the driving force of the rotary actuator, on the basis of an output of a rod transmitting force measurement force sensor fixed to the connecting rod; a controlled variable desired value setting means which sets a controlled variable desired value that is a desired value of a controlled variable requested to control the lifting force to a desired lifting force, where the controlled variable is one of the rod transmitting force and the driving torque applied to the third joint by the rod transmitting force; and an actuator control means which feedback-controls the driving force of the rotary actuator according to a value of the translational force measured by the rod transmitting force measuring means and the set controlled variable desired value so that the controlled variable coincides with the controlled variable desired value set by the controlled variable desired value setting means (a first aspect of the invention).

According to the first aspect of the invention, the power transmission system for each leg link converts the driving force (output torque) of the rotary actuator to the rod transmitting force which is the translational force in the longitudinal direction of the connecting rod via the driving crank arm. Further, the power transmission system converts the rod transmitting force to the driving torque around the joint axis of the third joint via the driven crank arm and applies the driving torque to the crus frame.

In this case, the connecting rod does not need to transmit such a large translational force that can support the weight of the entire walking assist device. Therefore, the range of values of the rod transmitting force is relatively small. Moreover, since the magnitude of the rod transmitting force is not so large, the connecting rod is less apt to be deformed. Consequently, the connecting rod is less apt to be subjected to a force in directions other than the longitudinal direction of the connecting rod, such as in the transverse (shear) direction of the connecting rod. Further, since the connecting rod is provided along the thigh frame of each leg link, the connecting rod is less likely to come into contact with other objects while the user is walking in comparison with the end side of each leg link (the lower end side of the crus frame).

Therefore, the rod transmitting force measuring means s capable of measuring the rod transmitting force with accuracy on the basis of an output of the rod transmitting force measurement force sensor fixed to the connecting rod. In the first aspect of the invention, the controlled variable is one of the rod transmitting force accurately measurable as described above and the driving torque applied to the third joint by the rod transmitting force (the driving torque is obtained by multiplying the rod transmitting force by a distance between the joint axis of the third joint and the connecting rod in the direction perpendicular to the longitudinal direction of the connecting rod).

Moreover, in the first aspect of the invention, the actuator control means feedback-controls the driving force of the rotary actuator so that the controlled variable coincides with the controlled variable desired value which is a desired value of the controlled variable requested to control the lifting force to a desired lifting force. This enables an actual controlled variable to coincide with the controlled variable desired value accurately and stably. In this case, the accurate and stable coincidence between the controlled variable and the controlled variable desired value means that it is consequently possible to stably control an actual supporting force acting on each leg link from the floor side to an appropriate supporting force (the supporting force corresponding to the controlled variable desired value) enabling the desired lifting force to be applied to the user from the lifting force transmitting portion.

Therefore, according to the first aspect of the invention, the walking assist device is capable of stably applying the desired lifting force to the user without directly measuring the supporting force applied to each leg link from the floor side.

In the first aspect of the invention described above, preferably the rod transmitting force measurement force sensor is a strain gauge force sensor secured to the connecting rod (a second aspect of the invention).

Specifically, the stain gauge constituting the strain gauge force sensor generally has high sensitivity only in a particular direction. Therefore, the use of the strain gauge force sensor enables more accurate measurement of the rod transmitting force in the longitudinal direction of the connecting rod.

Further, in the first and second aspect of the inventions, in cases where the driving torque applied to the third joint of each leg link is a driving torque in a direction of biasing the leg link in the stretching direction, preferably the connecting rod is pivotally attached to the driving crank arm and to the driven crank arm at one end and the other end, respectively, so that the rod transmitting force acting on the connecting rod is a tractive force in the longitudinal direction of the connecting rod (a third aspect of the invention).

Specifically, in order to apply an upward lifting force to the user from the lifting force transmitting portion, it is necessary to apply the driving torque, which biases the leg link in the stretching direction, to the third joint of the leg link connected to the foot attachment portion in contact with the ground. The rod transmitting force is largest at the time of applying the driving torque. In this case, according to the third aspect of the invention, the rod transmitting force in biasing the leg link in the stretching direction is a tractive force. Therefore, the rod transmitting force effectively prevents an occurrence of deformation such as buckling of the connecting rod. Consequently, the walking assist device is capable of measuring the rod transmitting force more accurately.

In the first to third aspect of the inventions, a more specific form, for example, as described below may be employed. Specifically, the walking assist device comprises: a desired supporting force setting means which sets a desired supporting force which is a desired value of a supporting force to be applied to each leg link from the floor side in order to control the lifting force to a desired lifting force; and a joint angle measuring means which measures a displacement angle of the third joint of the leg link. In the walking assist device, the controlled variable desired value setting means defines the controlled variable desired value as a value of the controlled variable, which is requested to provide the third joint of the leg link with a torque balanced with a moment applied to the third joint of the leg link by the desired supporting force, on the assumption that the desired supporting force set by the desired supporting force setting means is applied to the leg link from the floor side, and determines the controlled variable desired value on the basis of the set desired supporting force and the value of the displacement angle of the third joint measured by the joint angle measuring means for each leg link (a fourth aspect of the invention).

According to the fourth aspect of the invention, in order to control the lifting force to the desired lifting force, the desired supporting force setting means sets the desired supporting force which is a desired value of the supporting force to be applied to each leg link from the floor side. In addition, on the assumption that the desired supporting force is applied to the leg link from the floor side, the controlled variable desired value, which is requested to provide the third joint of the leg link with a torque balanced with a moment applied to the third joint of the leg link by the desired supporting force, is determined on the basis of the set desired supporting force and the value of the displacement angle of the third joint measured by the joint angle measuring means. Therefore, it is possible to easily determine a controlled variable desired value appropriate for controlling the lifting force to the desired lifting force. The reason for requiring the measured value of the displacement angle of the third joint in addition to the desired supporting force in order to determine the controlled variable desired value is that the moment acting on the third joint of the leg link by the desired supporting force varies according to the displacement angle of the third joint of the leg link.

Alternatively, preferably the form described below is employed in the first to third aspect of the inventions. Specifically, the walking assist device further comprises: a desired supporting force setting means which sets a desired supporting force which is a desired value of a supporting force to be applied to each leg link from the floor side in order to control the lifting force to a desired lifting force; a joint angle measuring means which measures a displacement angle of the third joint of the leg link; a controlled variable basic desired value determining means which defines a basic value of the controlled variable desired value as a value of the controlled variable requested to provide the third joint of the leg link with a torque balanced with a moment applied to the third joint of the leg link by the desired supporting force, on the assumption that the desired supporting force set by the desired supporting force setting means is applied to the leg link from the floor side, and determines the basic value on the basis of the set desired supporting force and the value of the displacement angle of the third joint measured by the joint angle measuring means; and a correction amount determining means which determines an additional correction amount including a correction amount of the basic value requested to provide the third joint of the leg link with a torque against at least one of a resistance force generated at the third joint of the leg link due to a frictional force at the third joint of the leg link, a resistance force generated at the third joint of the leg link due to an inertial force caused by a motion of a part on the foot attachment portion side from the third joint of the leg link, and a resistance force generated at the third joint of the leg link due to a gravity acting on the part on the foot attachment portion side from the third joint of the leg link, on the basis of the value of the displacement angle of the third joint measured by the joint angle measuring means. In the walking assist device, the controlled variable desired value setting means determines the controlled variable desired value by correcting the basic value determined by the controlled variable basic desired value determining means with the additional correction amount determined by the correction amount determining means for each leg link (a fifth aspect of the invention).

According to the fifth aspect of the invention, on the assumption that the desired supporting force set by the desired supporting force setting means is applied to the leg link from the floor side, the basic value of the controlled variable desired value is determined with the basic value defined as a value of the controlled variable requested to provide the third joint of the leg link with a torque balanced with the moment applied to the third joint of the leg link by the desired supporting force. Moreover, in the fifth aspect of the invention, an additional correction amount including a correction amount of the basic value is determined on the basis of the measured value of the displacement angle of the third joint, where the additional correction amount is requested to provide the third joint of the leg link with a torque against at least one of a resistance force generated at the third joint due to a frictional force at the third joint of the leg link, a resistance force generated at the third joint of the leg link due to an inertial force caused by a motion of the part on the foot attachment portion side from the third joint of each leg link, and a resistance force generated at the third joint of the leg link due to a gravity acting on the part on the foot attachment portion side from the third joint of each leg link. The controlled variable desired value is determined by correcting the basic value with the additional correction amount. Further, the actuator control means feedback-controls the driving force of the rotary actuator so that the controlled variable desired value determined in this manner coincides with an actual controlled variable. This enables the compensation for the effect of a resistance force caused by at least one of the frictional force, the inertial force, and the gravity described above. Consequently, it is possible to prevent the user from feeling uncomfortable in moving the foot attachment portion in the air.

The reason for requiring the measured value of the displacement angle of the third joint in the fifth aspect of the invention, in addition to the desired supporting force in order to determine the basic value of the controlled variable desired value, is that the moment acting on the third joint of the leg link by the desired supporting force varies according to the displacement angle of the third joint of the leg link.

Alternatively, preferably the desired supporting force is set, for example, as described below in the first to fifth aspect of the inventions. Specifically, the walking assist device further comprises a treading force measuring means which measures the treading force of each leg of the user on the basis of outputs of the treading force measurement force sensors mounted on each foot attachment portion so as to be opposed to the base of the foot of each leg of the user. The desired supporting force setting means then sets the desired supporting forces of the leg links so that the proportion between the supporting forces acting on the leg links from the floor side coincides with a predetermined rate determined according to the treading force values of the legs respectively measured by the treading force measuring means, while applying the desired lifting force to the trunk of the user from the lifting force transmitting portion. In other words, the desired supporting force setting means sets the desired supporting forces of the leg links so that the proportion in magnitude between the desired supporting forces is equal to a predetermined rate (for example, the same rate as the proportion between the measured values of the treading forces of the legs) according to the proportion between the measured values of the treading forces of the legs of the user.

DETAILED DESCRIPTION OF THE PREFERRED EMBODIMENTS

Figure 1:
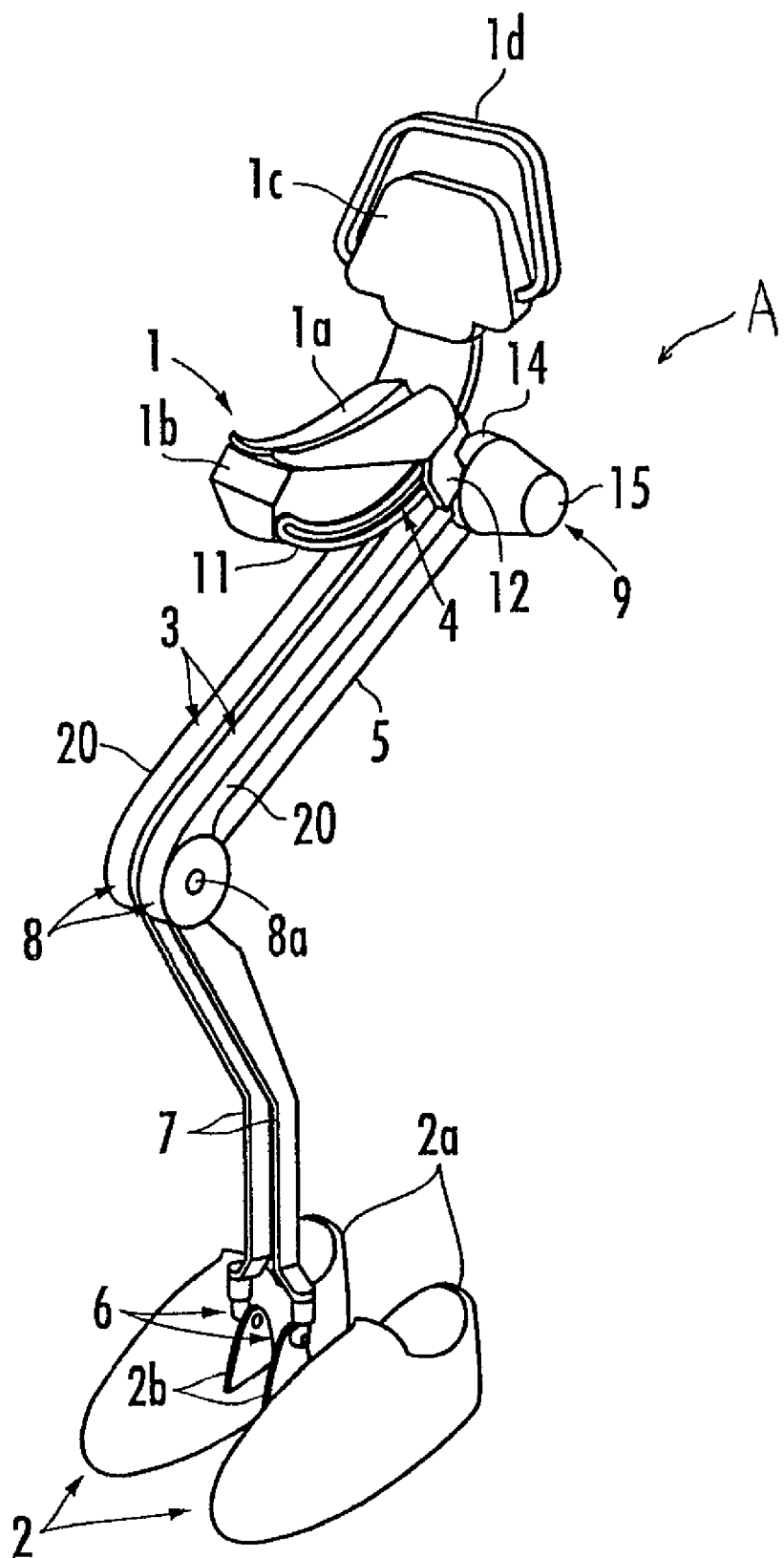
FIG. 1 is a perspective diagram illustrating a walking assist device according to one embodiment of the present invention.

An embodiment of the present invention will be described in detail hereinafter. First, a mechanical configuration of a walking assist device of this embodiment is described with reference to FIGS. 1 to 4.

As shown, the walking assist device A of this embodiment includes a seat member 1 as a lifting force transmitting portion, a pair of left and right foot attachment portions 2 and 2 fitted to the feet of the legs of a user P, and a pair of left and right leg links 3 and 3 connecting the foot attachment portions 2 and 2 to the seat member 1. The left and right foot attachment portions 2 and 2 have the same structure and are symmetrical with each other. The left and right leg links 3 and 3 have the same structure and are symmetrical with each other, too.

The leg link 3 includes a thigh frame 5 extending downward from the seat member 1 via a first joint 4, a crus frame 7 extending upward from the foot attachment portion 2 via a second joint 6, and a third joint 8 which is located between the first joint 4 and the second joint 6 to interconnect the thigh frame 5 and the crus frame 7 so that the frames freely bend and stretch.

Further, the walking assist device A has an actuator 9 which generates a driving force for driving the third joint 8 and a power transmission system 10 which transmits the driving force of the actuator 9 to the third joint 8 to apply a driving torque around a joint axis of the third joint 8 thereto for each leg link 3.

The seat member 1 includes a saddle-shaped seat 1a on which the user P is seated in a straddling manner (in a manner that the seat member 1 is positioned between the root ends of the legs of the user P), a supporting frame 1b attached to the undersurface of the seat 1a, and a hip cushion 1c mounted at the rear end (a raised portion which is raised upward at the back side of the seat 1a) of the supporting frame 1b. Additionally, the hip cushion 1c is provided with an arched gripper 1d that allows the user P or an attendant to grip.

Although the lifting force transmitting portion is formed by the seat member 1 with the saddle-shaped seat 1a in this embodiment, it is possible to use, for example, a harness-shaped flexible member as shown in FIG. 16 of Patent Document 1, instead. Preferably, the lifting force transmitting portion has a part in contact with the user P between the root ends of the legs in order to apply an upward lifting force to the trunk of the user P.

The first joint 4 of each leg link 3 has two degrees of freedom of rotation (two degrees of freedom) around two joint axes in the anteroposterior direction and in the horizontal direction. More specifically, the first joint 4 has an arc-shaped guide rail 11 connected to the seat member 1. The guide rail 11 is movably engaged with a slider 12 fixed to the top end of the thigh frame 5 of each leg link 3 via a plurality of rollers 13 rotatably attached to the slider 12. This enables the leg link 3 to make a swing motion in the anteroposterior direction (back and forth rocking motion) around a first joint axis of the first joint 4, where the first joint axis is a horizontal axis passing through the center of curvature 4a (See FIG. 2) of the guide rail 11 (more specifically, an axis in a direction perpendicular to the plane including the arc of the guide rail 11).

Moreover, the guide rail 11 is pivotally supported at the rear end (raised portion) of the supporting frame 1b of the seat member 1 via a spindle 4b whose central axis is oriented in the anteroposterior direction so as to be swingable around the central axis of the spindle 4b. This enables each leg link 3 to perform a swing motion in the horizontal direction around a second joint axis of the first joint 4, namely, an adduction and abduction motion, where the second joint axis is the central axis of the spindle 4b. In this embodiment, the second joint axis of the first joint 4 is a common joint axis between the left first joint 4 and the right first joint 4.

As described above, the first joint 4 is adapted to allow each leg links 3 to perform swing motions around two joint axes in the anteroposterior direction and in the horizontal direction.

The degrees of freedom of rotation of the first joint is not limited to "two." For example, the first joint may be adapted to have the degrees of freedom of rotation around three joint axes (three degrees of freedom). Alternatively, the first joint may be adapted to have, for example, only a degree of freedom of rotation around one joint axis (one degree of freedom) in the horizontal direction.

Figure 2:
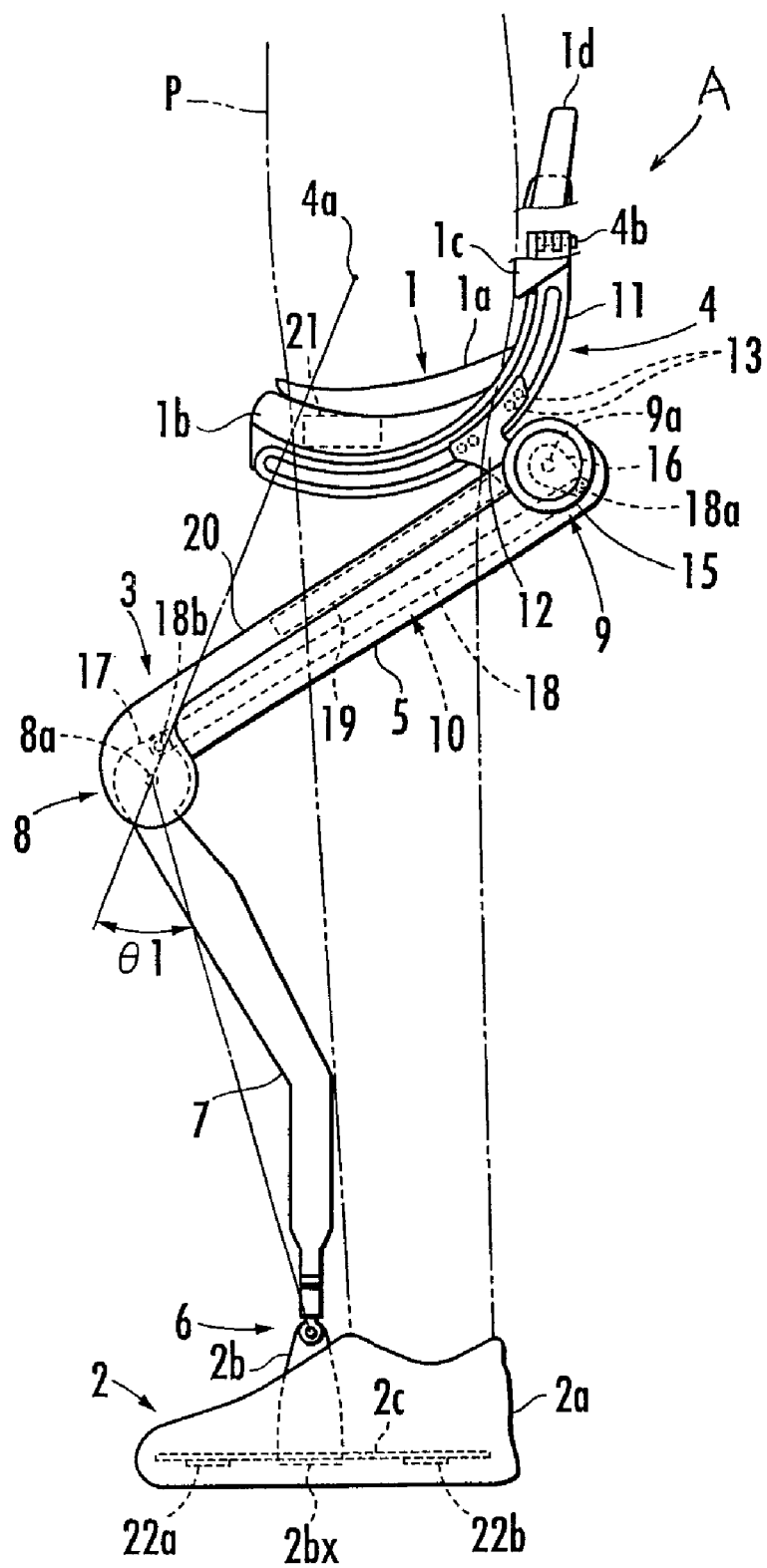
FIG. 2 is a side view of the walking assist device.
Figure 3:
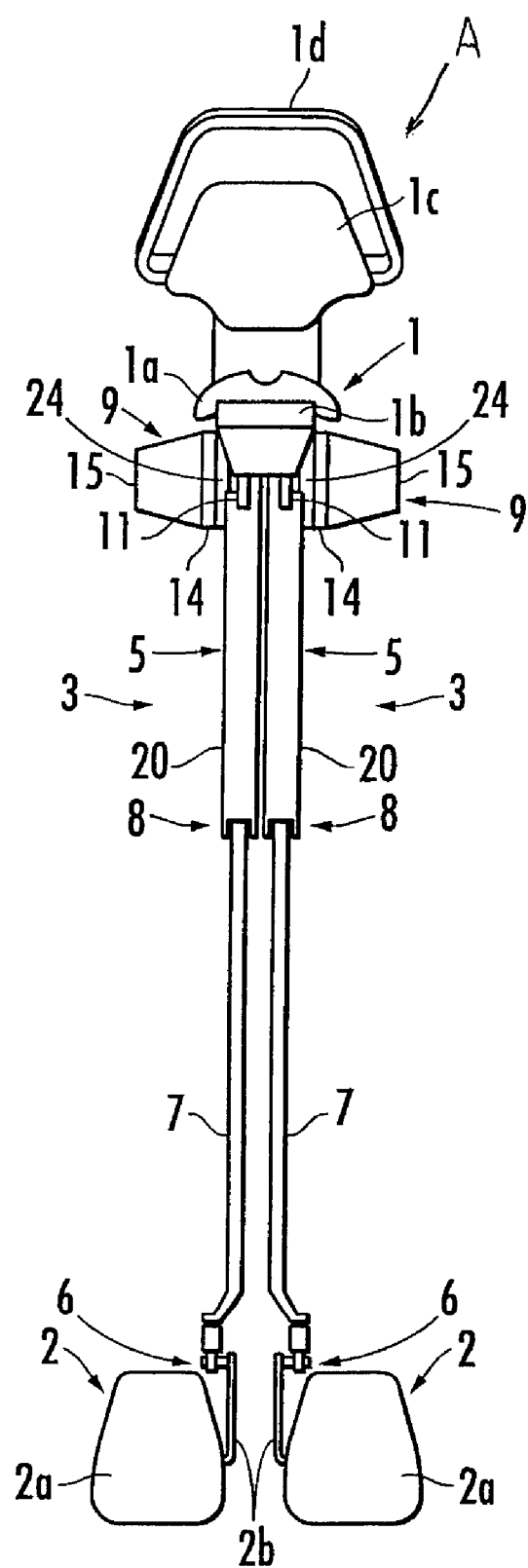
FIG. 3 is a front view of the walking assist device.

Each foot attachment portion 2 includes a shoe 2a fitted to the corresponding foot of the user P and a connecting member 2b projecting upwardly from the inside of the shoe 2a. The foot attachment portion 2 is in contact with the ground via the shoe 2a in a state where the leg of the user P is standing (supporting leg). The connecting member 2b is connected to the bottom end of the crus frame 7 of the leg link 3 via the second joint 6. In this instance, the connecting member 2b is integrally provided with a flat-plate portion 2bx placed on the backside of an insole 2c in the shoe 2a (between the bottom of the shoe 2a and the insole 2c) as shown in FIG. 2. The connecting member 2b including the flat-plate portion 2bx is formed of a relatively highly-rigid member. Thereby, it is possible to apply a part of the floor reaction force (at least a translational force large enough to support the weight of the walking assist device A plus a part of the weight of the user P), which acts on the foot attachment portion 2 from the floor side, to the leg link 3 via the connecting member 2b and the second joint 6 when the foot attachment portion 2 is put in contact with the ground.

The foot attachment portion 2 may include, for example, a slipper-shaped member, instead of the shoe 2a.

In this embodiment, the second joint 6 is formed of a free joint such a ball joint and has three degrees of freedom of rotation around three axes. The second joint, however, may be a joint having, for example, two degrees of freedom of rotation around two axes in the anteroposterior and horizontal directions or two degrees of freedom of rotation around two axes in the vertical and horizontal directions.

The third joint 8 has a degree of freedom of rotation around one axis in the horizontal direction. The third joint 8 has a spindle 8a which pivotally support the top end of the crus frame 7 at the bottom end of the thigh frame 5. The central axis of the spindle 8a is substantially parallel to the first joint axis (an axis perpendicular to the plane including the arc of the guide rail 11) of the first joint 4. The central axis of the spindle 8a serves as the joint axis of the third joint 8. The crus frame 7 is rotatable relative to the thigh frame 5 around the joint axis. This enables the bending and stretching motion of the leg link 3 at the third joint 8.

The actuator 9 provided in each leg link 3 is a rotary actuator formed by an electric motor 15 with a reduction gear 14. The rotary actuator 9 is mounted on the outer surface of the top end (near the first joint 4) of the thigh frame 5 so that the central axis of an output shaft 9a is parallel to the joint axis of the third joint 8 (the central axis of the spindle 8a). A housing (a portion fixed to a stator of the electric motor 15) of the rotary actuator 9 is provided in a fixed manner on the thigh frame 5.

In this embodiment, each power transmission system 10 includes a driving crank arm 16 fixed coaxially with the output shaft 9a of the rotary actuator 9, a driven crank arm 17 fixed to the crus frame 7 coaxially with the joint axis of the third joint 8, and a connecting rod 18 pivotally attached to the driving crank arm 16 and to the driven crank arm 17 at one end and the other end, respectively. The connecting rod 18 linearly extends between a pivotally attached portion 18a to the driving crank arm 16 and a pivotally attached portion 18b to the driven crank arm 17. In the power transmission system 10 having the above structure, the driving force (output torque) output from the output shaft 9a of the rotary actuator 9 by the operation of the electric motor 15 is converted to a translational force in the longitudinal direction of the connecting rod 18 from the output shaft 9a via the driving crank arm 16. Thereafter, the translational force (rod transmitting force) is transmitted through the connecting rod 18 in the longitudinal direction thereof. Further, the translational force is converted to a driving torque from the connecting rod 18 via the driven crank arm 17. Then, the driving torque is applied to the third joint 8 as a driving force for bending and stretching the leg link 3 around the joint axis of the third joint 8.

In this embodiment, the total sum of the lengths of the thigh frame 5 and the crus frame 7 of each leg link 3 is greater than the length of the leg of the user P in a state where the leg is linearly extending. Therefore, the leg links 3 are always flexed at the third joints 8. The flexion angle $\theta1$ (See FIG. 2) ranges, for example, from approx. 40° to 70° during normal walking of the user P on flat ground. The flexion angle $\theta1$ in this specification means an angle between a linear line connecting the third joint 8 and the center of curvature 4a of the guide rail 11 and a linear line connecting the third joint 8 and the second joint 6 (an angle on the acute side), with each leg link 3 viewed in the direction of the joint axis of the third joint 8, as shown in FIG. 2. In this embodiment, a relative positional relation is set among the pivotally attached portions 18a and 18b of the connecting rod 18, the joint axis of the third joint 8, and the output shaft 9a of the rotary actuator 9 in such a way that the driving torque applied to the third joint 8 is greater than the output torque of the rotary actuator 9 in a state where the flexion angle $\theta1$ of each leg link 3 is within a certain angle range (for example, a range of approx. 20° to 70°) including the range of angles observed during normal walking of the user P on flat ground. In this condition, when each leg link 3 is viewed in the direction of the joint axis of the third joint 8 in this embodiment, the linear line between the output shaft 9a of the rotary actuator 9 and the third joint 8 obliquely intersects with the linear line between the pivotally attached portions 18a and 18b of the connecting rod 18 as shown in FIG. 4.

Further, in this embodiment, the position of the pivotally attached portion 18b of the connecting rod 18 is set in such a way that the driving torque applied to the third joint 8 functions as a torque for biasing the leg link 3 in the stretching direction in cases where a tractive force in the longitudinal direction of the connecting rod 18 is applied to the connecting rod 18 by the rotary actuator 9 in a state where the flexion angle $\theta1$ of each leg link 3 is within a certain angle range (for example, a range of approx. 20° to 70°) including the range of angles observed during normal walking of the user P on flat ground. In this case, when the leg link 3 is viewed in the direction of the joint axis of the third joint 8 in this embodiment, the pivotally attached portion 18b of the connecting rod 18 is provided closer to the guide rail 11 than the linear line between the output shaft 9a of the rotary actuator 9 and the third joint 8.

Figure 4:
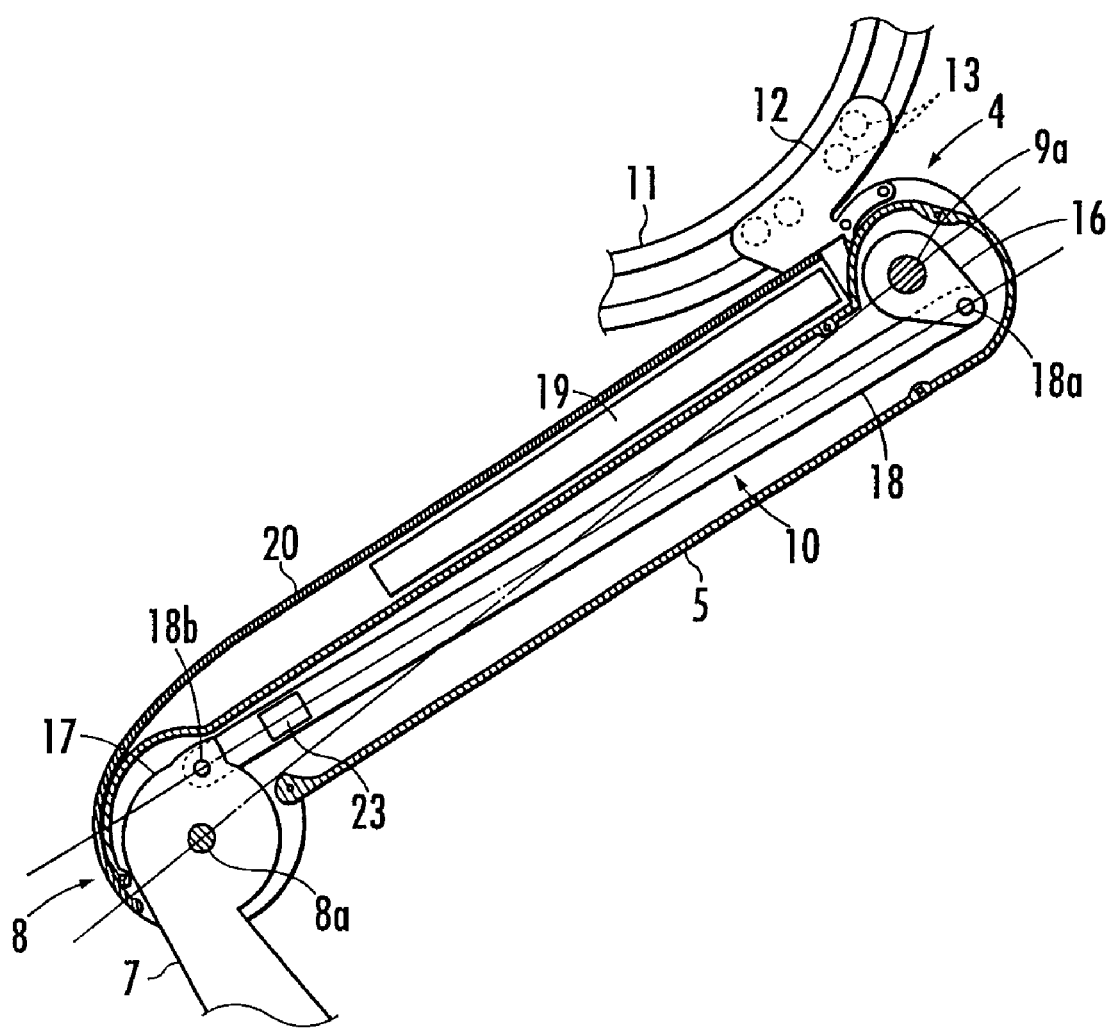
FIG. 4 is a cross-sectional side view of a thigh frame of the walking assist device.

Moreover, as shown in FIG. 4, the thigh frame 5 is provided with a battery 19 placed between the connecting rod 18 and the guide rail 11 and a cover 20 for covering the battery 19. The battery 19 is a power supply for electric devices such as the electric motor 15.

The above is the main mechanical configuration of the walking assist device A according to this embodiment. In the walking assist device A having the above structure, the seat member 1 is biased upwardly by applying the driving force (driving torque) in the stretching direction to the third joint 8 of the leg link 3 from the rotary actuator 9 via the power transmission system 10 in a state where the foot attachment portion 2 is in contact with the ground. This causes the upward lifting force to act on the user P from the seat member 1. In the walking assist device A of this embodiment, the lifting force supports a part of the weight of the user P (a part of the gravity acting on the user P) to reduce the load on the leg in walking of the user P.

In this condition, the walking assist device A bears the share of the supporting force for supporting the weight of the walking assist device A and a part of the weight of the user P on the floor of the supporting force for supporting the entire weight of the walking assist device A and the user P on the floor (the total translational force acting on the supporting surface of the walking assist device A from the floor, which is hereinafter referred to as "total supporting force"), and the user P bears the share of the remaining supporting force. Hereinafter, in the above total supporting force, the supporting force as the share of the walking assist device A is referred to as "assist cevice share supporting force" and the supporting force as the share of the user P is referred to as "user share supporting force." The assist device share supporting force acts on both of the leg links 3 and 3 in a distributed manner in a state where the legs of the user P are standing. In a state where only one leg of the user P is standing, the assist device share supporting force acts only on the standing leg link 3 of the leg links 3 and 3. The same applies to the user share supporting force.

Although not shown, the walking assist device is provided with a spring (not shown) for biasing the leg link 3 in the stretching direction in this embodiment at the third joint 8 of each leg link 3 or between the thigh frame 5 and the crus frame 7 in order to reduce the load on the rotary actuator 9 (to reduce the required maximum output torque). The spring, however, is omissible.

The following describes a structure for controlling the motion of the walking assist device A according to this embodiment. In the walking assist device A of this embodiment, the supporting frame 1b of the seat member 1 houses a controller 21 (control device) for controlling the operation of the electric motor 15 of each rotary actuator 9 as shown in FIG. 2.

Moreover, the walking assist device A has sensors as described below and outputs of the sensors are input to the controller 21. As shown in FIG. 2, the shoe 2a of each foot attachment portion 2 contains a pair of treading force measurement force sensors 22a and 22b for use in measuring the treading force of each leg (a vertical translational force pushing the foot of each leg toward the floor) of the user P. The treading force of each leg is, in other words, a translational force that is balanced with a force acting on each leg (share of each leg) of the user share supporting force. The magnitude of the total sum of the treading forces of the legs is equal to the magnitude of the user share supporting force. In this embodiment, the treading force measurement force sensors 22a and 22b are mounted on the undersurface of the insole 2c in the shoe 2a so as to be opposed to the base of the foot of the user P at two places (front and rear), namely just under the metatarscphalangeal joint (MP joint) and just under the heel of the foot of the user P. These treading force measurement force sensors 22a and 22b are each formed by a one-axis force sensor and generate an output according to the translational force in the direction perpendicular to the base of the shoe 2a.

Moreover, as shown in FIG. 4, a strain gauge force sensor 23 as a rod transmitting force measurement force sensor is mounted on the connecting rod 18 of each power transmission system 10 at a place near the third joint 8. The strain gauge force sensor 23 is a well-known sensor composed of a plurality of strain gauges (not shown) secured to the outer peripheral surface of the connecting rod 18 and generates an output according to the translational force acting on the connecting rod 18 in the longitudinal direction thereof. The strain gauge force sensor 23 has high sensitivity to the translational force in the longitudinal direction of the connecting rod 18, while having sufficiently low sensitivity to the force in the shear direction (transverse direction) of the connecting rod 18.

Moreover, in order to measure the flexion angle of each leg link 3 as an angle representing a displacement angle (a relative rotation angle from a reference position of the crus frame 7 with respect to the thigh frame 5) of the third joint 8 of each leg link 3, an angle sensor 24 (shown in FIG. 3) such as a rotary encoder which generates an output according to the rotation angle (the rotation angle from the reference position) of the output shaft 9a of each rotary actuator 9 is mounted on the thigh frame 5 integrally with the rotary actuator 9. In this embodiment, the flexion angle of the third joint 8 of each leg link 3 is uniquely determined according to the rotation angle of the output shaft 9a of each rotary actuator 9. Therefore, the angle sensor 24 generates an output according to the flexion angle of each leg link 3. The third joint 8 of each leg link 3 corresponds to the knee joint and therefore the flexion angle of each leg link 3 at the third joint 8 is referred to as a knee angle in the following description.

Incidentally, it is possible to mount an angle sensor such as a rotary encoder at the third joint 8 of each leg link 3 so as to directly measure the knee angle of the leg link 3 by means of the angle sensor, instead.

Figure 5:
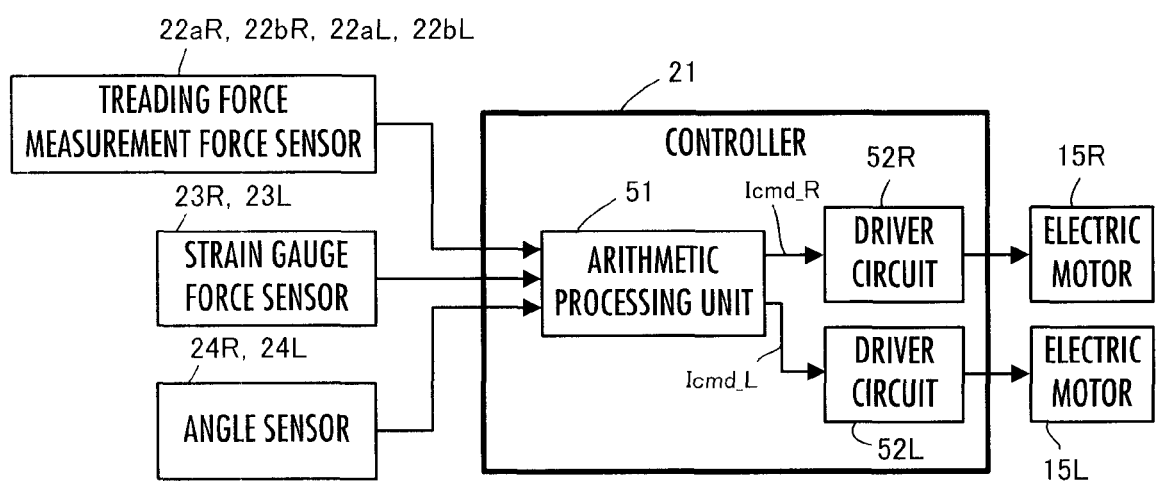
FIG. 5 is a block diagram illustrating the outline of a hardware configuration of a controller provided in the walking assist device.
Figure 6:
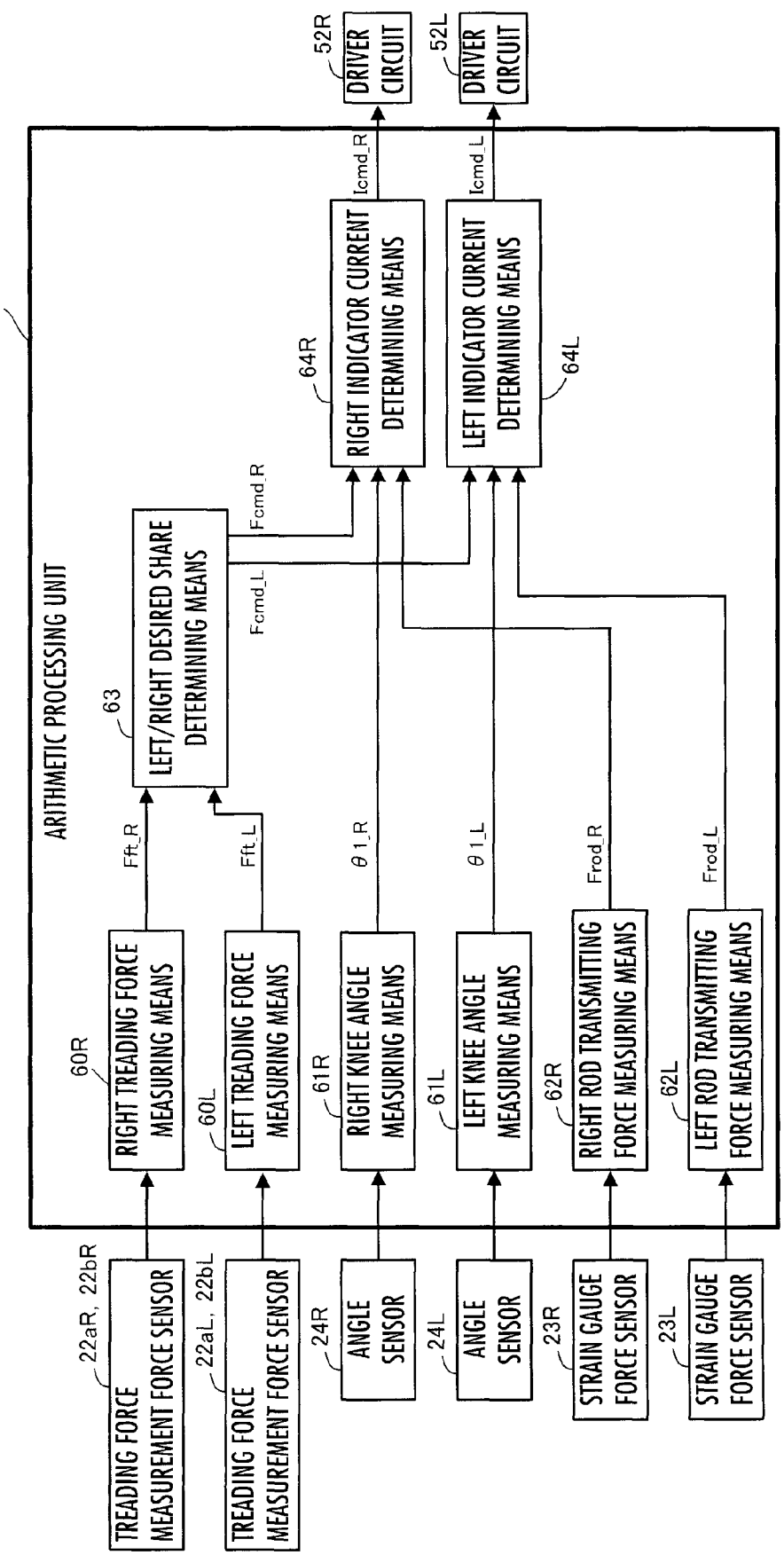
FIG. 6 is a block diagram illustrating a processing function of an arithmetic processing unit of the controller.

The following describes the functions of the controller 21 in more detail with reference to FIGS. 5 and 6. In the following description, a character "R" or "L" may be added to the end of a reference character in order to distinguish between left and right. For example, a term "leg link 3R" is used to indicate the leg link 3 on the right side of the user P in the forward direction and "leg link 3L" is used to indicate the leg link 3 on the left side of the user P. The character "R" and "L" at each end of reference characters are used to indicate elements related to the right leg link 3R or to the left leg link 3L.

As shown in FIG. 5, the controller 21 includes an arithmetic processing unit 51 and driver circuits 52R and 52L which respectively apply electric current to the electric motors 15R and 15L of the rotary actuators 9R and 9L. The arithmetic processing unit 51 is composed of a microcomputer including a CPU, a RAM, and a ROM. The arithmetic processing unit 51 receives outputs of treading force measurement force sensors 22aR, 22bR, 22aL, and 22bL, outputs of strain gauge force sensors 23R and 23L, and outputs of angle sensors 24R and 24L via an interface circuit (not shown) composed of an A/D converter or the like. Thereafter, the arithmetic processing unit 51 determines indicator current values Icmd_R and Icmd_L which are indicator values (desired values) of the applied current of the electric motors 15R and 15L by performing desired arithmetic processing by using detection data having been input and previously-stored reference data and program. The arithmetic processing unit 51 then controls the driver circuits 52R and 52L to apply the current of the indicator current values Icmd_R and Icmd_L to the electric motors 15R and 15L, respectively. This controls the output torques of the electric motors 15R and 15L and consequently the output torques of the rotary actuators 9R and 9L.

The arithmetic processing unit 51 has functional means as shown in the block diagram of FIG. 6 in order to determine the above indicator current values Icmd_R and Icmd_L. The functional means are functions implemented by the program mounted on the arithmetic processing unit 51.

As shown in FIG. 6, the arithmetic processing unit 51 includes: a right treading force measuring means 60R which measures a treading force of the right leg of the user P on the basis of the outputs of the right treading force measurement force sensors 22aR and 22bR; a left treading force measuring means 60L which measures a treading force of the left leg of the user P on the basis of the outputs of the left treading force measurement force sensors 22aL and 22bL; a right knee angle measuring means 61R which measures a knee angle of the leg link 3R on the basis of an output of the right angle sensor 24R; a left knee angle measuring means 61L which measures a knee angle of the leg link 3L on the basis of an output of the left angle sensor 24L; a right rod transmitting force measuring means 62R which measures a rod transmitting force acting on the connecting rod 18R of the power transmission system 10R (a translational force acting in the longitudinal direction of the connecting rod 18R) on the basis of an output of the right strain gauge force sensor 23R; and a left rod transmitting force measuring means 62L which measures a rod transmitting force acting on the connecting rod 18L of the power transmission system 10L (a translational force acting in the longitudinal direction of the connecting rod 18L) on the basis of an output of the left strain gauge force sensor 23L.

Moreover, the arithmetic processing unit 51 includes a left/right desired share determining means 63 which determines desired values Fcmd_R and Fcmd_L of the shares of the leg links 3R and 3L of the assist device share supporting force. The left/right desired share determining means 63 receives inputs of the left and right treading force values (measured values) Fft_R and Fft_L measured by the treading force measuring means 60R and 60L in order to determine the desired values Fcmd_R and Fcmd_L.

Incidentally, the total sum of the supporting forces which respectively act on the leg links 3R and 3L via the second joints 6R and 6L from the floor side (hereinafter, the total sum is referred to as "total lifting force") is more accurately a supporting force obtained by subtracting the supporting forces for supporting the foot attachment portions 2R and 2L on the floor from the assist device share supporting force. In other words, the total lifting force means an upward translational force for supporting the weight of the walking assist device A not including the foot attachment portions 2R and 2L and a part of the weight of the user P. Note that, however, the total weight of the foot attachment portions 2R and 2L is sufficiently small in comparison with the total weight of the walking assist device A and therefore the total lifting force substantially coincides with the assist device share supporting force. In the following description, the shares of the leg links 3R and 3L of the assist device share supporting force are totally referred to as "total lifting force share." In addition, the desired values Fcmd_R and Fcmd_L of the total lifting force share of the leg links 3R and 3L are referred to as leg link share desired values Fcmd_R and Fcmd_L.

The arithmetic processing unit 51 further includes: a right indicator current determining means 64R which determines the indicator current value Icmd_R of the electric motor 15R on the basis of a measured value Frod_R of the rod transmitting force of the connecting rod 18R measured by the right rod transmitting force measuring means 62R, a right leg link share desired value Fcmd_R determined by the left/right desired share determining means 63, and a measured value θ1_R of the knee angle of the leg link 3R measured by the right knee angle measuring means 61R; and a left indicator current determining means 64L which determines the indicator current value Icmd_L of the electric motor 15L on the basis of a measured value Frod_L of the rod transmitting force of the connecting rod 18L measured by the left rod transmitting force measuring means 62L, a left leg link share desired value Fcmd_L determined by the left/right desired share determining means 63, and a measured value θ1L of the knee angle of the leg link 3L measured by the left knee angle measuring means 61L.

The following describes the details of the processing of the arithmetic processing unit 51. The controller 21 is turned on in a state where the user P wears the foot attachment portions 2 on the feet with the seat member 1 placed under the crotch of the user P. In this condition, the arithmetic processing unit 51 performs processing described below at predetermined control processing cycles.

In each control processing cycle, the arithmetic processing unit 51 first performs processing of the treading force measuring means 60R and 60L, processing of the knee angle measuring means 61R and 61L, and processing of rod transmitting force measuring means 62R and 62L. The processing of the knee angle measuring means 61R and 61L and the processing of the rod transmitting force measuring means 62R and 62L may be performed after or in parallel to processing of the left/right desired share determining means 63, instead.

The processing of the treading force measuring means 60R and 60L is performed as described below. The algorithm of the processing is the same in either of the treading force measuring means 60R and 60L. Therefore, the processing of the right treading force measuring means 60R will be typically described below.

The right treading force measuring means 60R obtains a measured value Fft_R of the treading force of the right leg of the user P by adding up the force detected values indicated by the outputs of the treading force measurement force sensors 22a and 22bR, respectively (more specifically, force detected values obtained after low-pass characteristic filtering to remove noise components). The same applies to the processing of the left treading force measuring means 60L.

The processing of the treading force measuring means 60 may additionally include limit processing for forcibly setting the measured value Fft of the treading force to "0" in cases where the total sum of the force detected values of the treading force measurement force sensors 22a and 22b corresponding to the respective treading force measuring means 60R and 60L is a very small value less than a predetermined lower limit. Alternatively, it is possible to add limit processing for forcibly setting the measured value Fft of the treading force to a predetermined upper limit in cases where the total sum exceeds the upper limit. In this embodiment, as described later, the proportion between the leg link share desired values Fcmd_P and Fcmd_L is basically determined according to the proportion between the measured value Fft_R of the treading force of the right leg of the user P and the measured value Fft_L of the treading force of the left leg of the user P. In this case, it is effective to add the limit processing to the processing of the treading force measuring means 60 in order to prevent frequent changes in proportion between the leg link share desired values Fcmd_R and Fcmd_L.

Moreover, the processing of the knee angle measuring means 61R and 61L is performed as described below. The algorithm is the same in either of the knee angle measuring means 61R and 61L. Therefore, the processing of the right knee angle measuring means 61R is typically described below. The right knee angle measuring means 61R obtains a provisional measurement value of the knee angle of the leg link 3R from a rotation angle of the output shaft 9aR of the rotary actuator 9R indicated by an output of the angle sensor 24R on the basis of a preset arithmetic expression or data table (an arithmetic expression or a data table representing a relationship between the rotation angle and the knee angle of the leg link 3R). The right knee angle measuring means 61R then obtains a measured value θ1_R of the knee angle of the leg link 3R by performing low-pass characteristic filtering for the provisional measurement value to remove noise components. The same applies to the processing of the left knee angle measuring means 61L.

In this embodiment, the above-described knee angle measuring means 61R and 61L correspond to the joint angle measuring means of the present invention.

Specifically, the knee angle measured by the knee angle measuring means 61 is the angle θ1 shown in FIG. 2, though the knee angle may be a supplementary angle of the angle θ1 (=180°−θ1), instead. Alternatively, for example, when viewed in the joint axis direction of the third joint 8 of each leg link 3, the knee angle may be defined as an angle between the longitudinal direction of the thigh frame 5 of each leg link 3 and a linear line connecting the third joint 8 to the second joint 6 of the leg link 3. In the following description, the knee angle measured by the knee angle measuring means 61 is assumed to be the angle θ1 shown in FIG. 2.

Moreover, the processing of the rod transmitting force measuring means 62R and 62L is performed as described below. The algorithm of the processing is the same in either of the rod transmitting force measuring means 62R and 62L. Therefore, the following typically describes the processing of the right rod transmitting force measuring means 62R. The right rod transmitting force measuring means 62R converts an input voltage value output from the strain gauge force sensor 23R to a measured value Frod_R of the rod transmitting force on the basis of the preset arithmetic expression or data table (the arithmetic expression or data table representing a relationship between the output voltage and the rod transmitting force). The same applies to the processing of the left rod transmitting force measuring means 62L. In this case, noise components may be removed by performing low-pass characteristic filtering for the output value of each strain gauge force sensor 23 or for the measured value Frod of each rod transmitting force.

Incidentally, in this embodiment, the above-described rod transmitting force measuring means 62R and 62L correspond to the rod transmitting force measuring means of the present invention.

Figure 7:
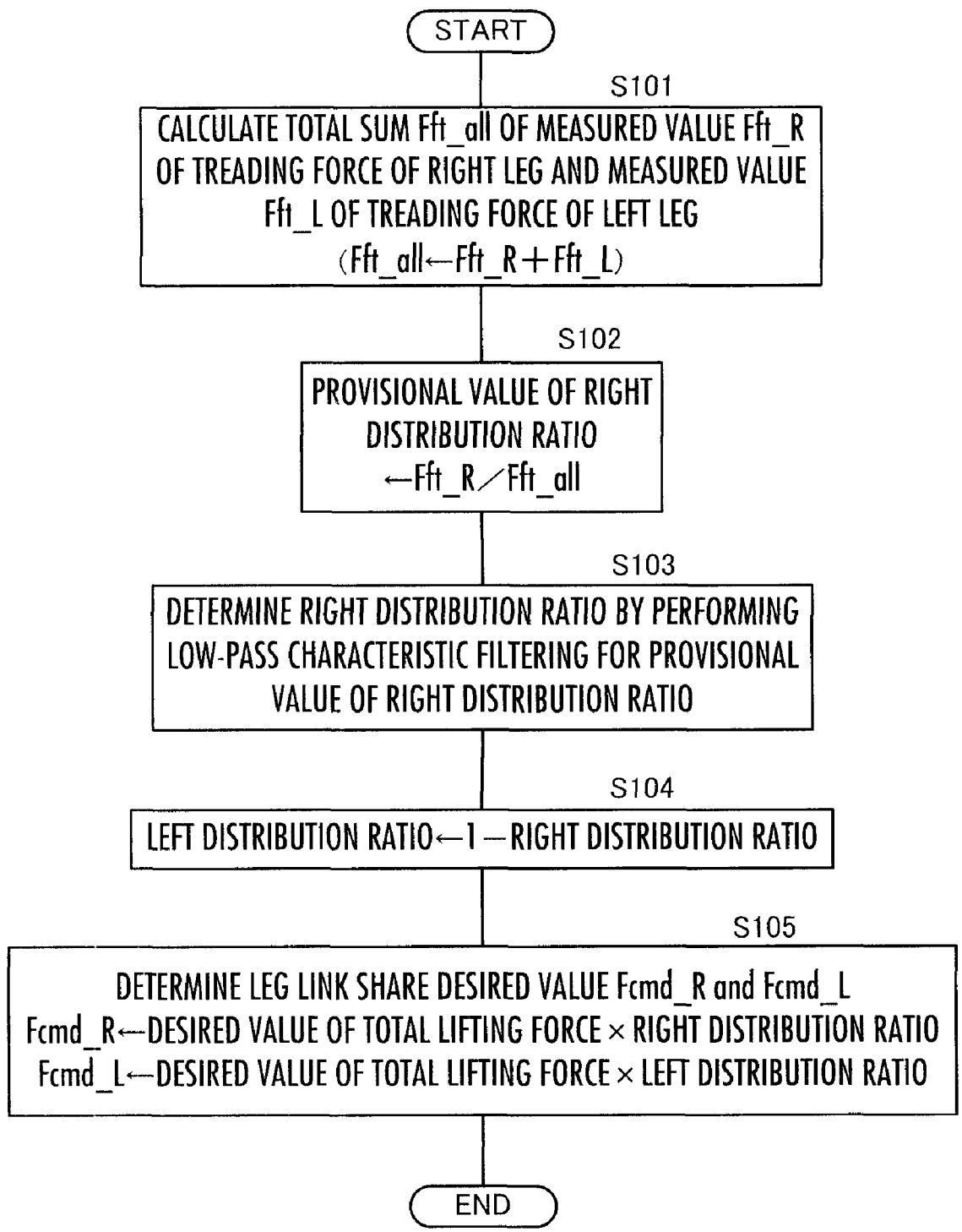
FIG. 7 is a flowchart illustrating processing of a left/right desired share determining means shown in FIG. 6.

Subsequently, the arithmetic processing unit 51 performs the processing of the left/right desired share determining means 63. This processing will be described in detail below with reference to FIG. 7.

First, the left/right desired share determining means 63 performs the processing of steps S101 to S104 to determine a right distribution ratio which is the ratio of the right leg link share desired value to the desired value of the total lifting force (approximately equal to the assist device share supporting force) and a left distribution ratio which is the ratio of the left leg link share desired value to the desired value of the total lifting force. The total sum of the right distribution ratio and the left distribution ratio is 1.

In step S101, the left/right desired share determining means 63 calculates the total sum Fft_all (=Fft_R+Fft_L) of the measured value Fft_R of the treading force of the right leg and the measured value Fft_L of the treading force of the left leg obtained by the treading force measuring means 60R and 60L, respectively.

Subsequently, in step S102, a value Fft_R/Fft_all is obtained by dividing the measured value Fft_R of the treading force of the right leg by the total sum Fft_all and is set as a provisional value of the right distribution ratio.

Next, in step S103, the left/right desired share determining means 63 performs low-pass characteristic filtering for the provisional value of the right distribution ratio to ultimately determine the right distribution ratio (the right distribution ratio in the current control processing cycle). Then, in step S104, the left/right desired share determining means 63 subtracts the right distribution ratio determined as described above from 1 to determine the left distribution ratio. The filtering in step S103 is performed to prevent a rapid change in the right distribution ratio (consequently, a rapid change in the left distribution ratio).

In addition, it is possible to determine a provisional value of the left distribution ratio and to determine a ratio obtained by performing the low-pass characteristic filtering for the provisional value as a left distribution ratio, instead of determining the provisional value of the right distribution ratio in step S102. Thereafter, the right distribution ratio may be determined by subtracting the left distribution ratio determined in this manner from 1. In this case, in step S102, the value Fft_L/Fft_all, which is obtained by dividing the measured value Fft_L of the treading force of the left leg by the total sum Fft_all, may be determined as a provisional value of the left distribution ratio.

After determining the right distribution ratio and the left distribution ratio as described above, the left/right desired share determining means 63 then multiplies the desired value of the total lifting force by the right distribution ratio or the left distribution ratio in step S105 to determine the leg link share desired value Fcmd_R which is the desired value of the total lifting force share of the right leg link 3R and the leg link share desired value Fcmd_L which is the desired value of the total lifting force share of the left leg link 3L.

The desired value of the total lifting force is preset as described below and stored in a memory, which is not shown, in this embodiment. For example, the left/right desired share determining means 63 obtains the magnitude of the gravity (the weight×gravitational acceleration) acting on the total weight of the entire weight of the walking assist device A (or the weight obtained by subtracting the total weight of the foot attachment portions 2 and 2 from the entire weight) plus a part of the weight of the user P to be supported by the lifting force acting on the user P from the seat member 1 (for example, the weight obtained by multiplying the entire weight of the user P by a preset ratio) and sets the magnitude of the gravity as the desired value of the total lifting force. In this case, consequently an upward translational force whose magnitude is equivalent to the gravity acting on a part of the weight of the user P is set as the desired lifting force from the seat member 1 to the user P.

Alternatively, it is possible to allow the magnitude of the desired lifting force applied from the seat member 1 to the user P to be directly set in the arithmetic processing unit 51. In addition, the arithmetic processing unit 51 may calculate the total sum of the desired lifting force and the magnitude of the gravity acting on the entire weight of the walking assist device A (or the weight of the entire weight minus the total weight of the foot attachment portions 2 and 2), as a desired value of the total lifting force. Moreover, if a vertical inertial force generated by the motion of the walking assist device A is large in comparison with the above gravity, the magnitude of the total sum of the inertial force and the foregoing gravity may be set as a desired value of the total lifting force. In this instance, it is necessary to estimate the inertial force sequentially. The estimation can be performed by a method described in Patent Document 2, for example.

The above is the processing of the left/right desired share determining means 63. With this processing, the left/right desired share determining means 63 determines the right leg link share desired value Fcmd_R and the left leg link share desired value Fcmd_L so that the proportion (ratio) between the desired values coincides with the ratio between the right distribution ratio and the left distribution ratio (the ratio between Fft_R and Fft_L) determined according to the measured value Fft_R of the treading force of the right leg of the user P and the measured value Fft_L of the treading force of the left leg of the user P.

Additionally, in this embodiment, the left/right desired share determining means 63 described above corresponds to the desired supporting force setting means of the present invention. In this instance, the leg link share desired values Fcmd_R and Fcmd_L correspond to the desired supporting forces of the present invention.

Figure 8:
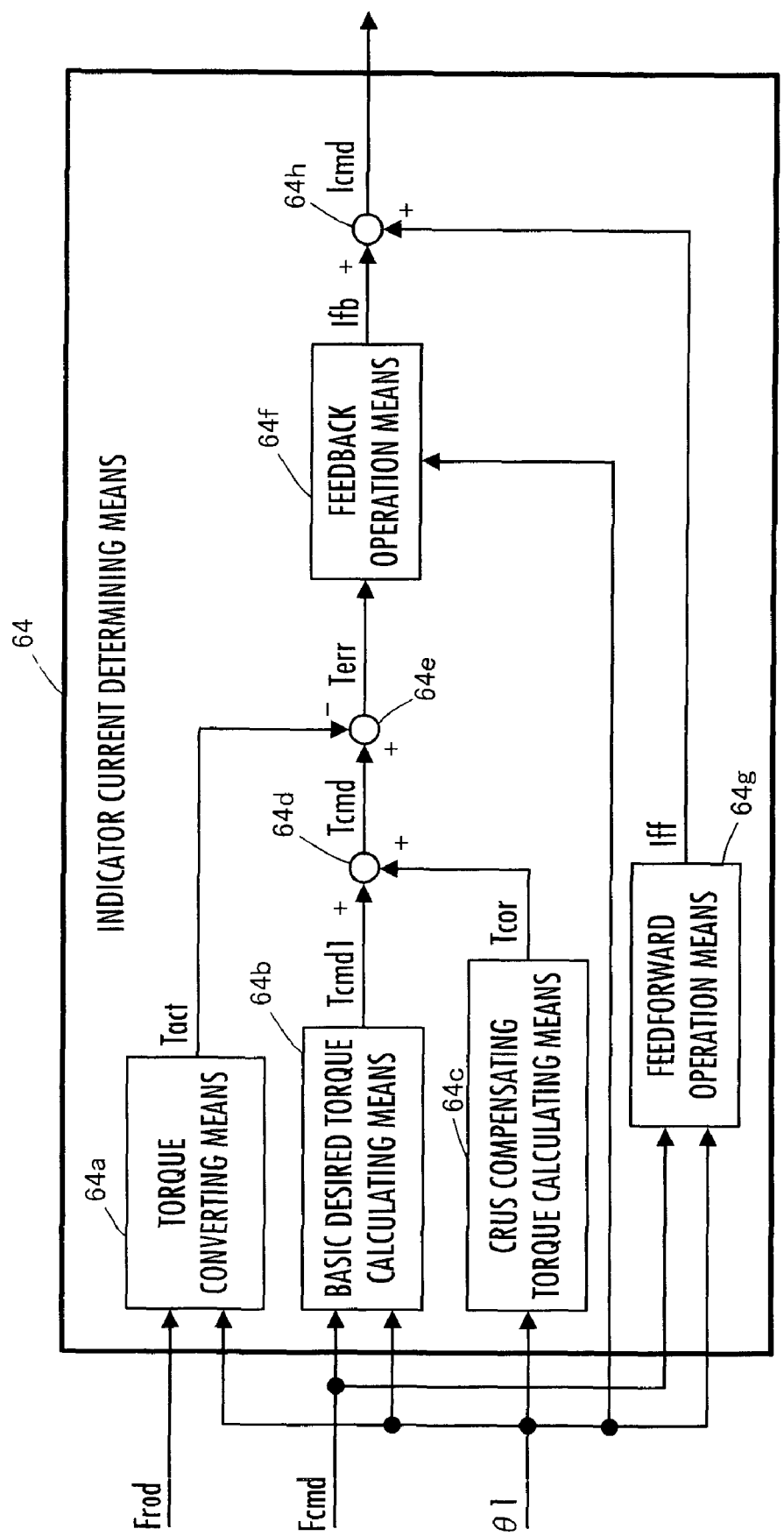
FIG. 8 is a block diagram illustrating a processing function of an indicator current determining means shown in FIG. 6.

After the completion of processing of the left/right desired share determining means 63 as described above, the arithmetic processing unit 51 performs processing of indicator current determining means 64R and 64L. The algorithm of the processing is the same in either of the indicator current determining means 64R and 64L. Therefore, the processing of the right indicator current determining means 64R will be typically described below with reference to FIG. 8. FIG. 8 is a block diagram illustrating functional means of the right indicator current determining means 64R. Although the characters "R" and "L" at each end of the reference characters are omitted in the following description of the right indicator current determining means 64R, unless otherwise specified herein, the reference characters are assumed to relate to the right leg link 3R (the character "R" is omitted).

The right indicator current determining means 64 includes: a torque converting means 64a which converts a measured value Frod of the rod transmitting force of the connecting rod 18 measured by the right rod transmitting force measuring means 62 to a value Tact of the driving torque actually applied to the third joint 8 in response to the measured value Frod (hereinafter, the driving torque value Tact is referred to as "actual joint torque Tact"); a basic desired torque calculating means 64b which obtains a basic desired torque Tcmd1 that is a basic value of the desired value of the driving torque to be applied to the third joint 8 in response to the right leg link share desired value Fcmd determined by the left/right desired share determining means 63; and a crus compensating torque calculating means 64c which obtains a torque Tcor to be additionally applied to the third joint 8 in order to compensate for the effect of a frictional force or the like generated due to a rotational motion of the crus frame 7 relative to the thigh frame 5 at the time of driving the third joint 8 (hereinafter, the torque Tcor is referred to as "crus compensating torque Tcor).

Further, the right indicator current determining means 64 includes: an addition operation means 64*d* which determines a desired joint torque Tcmd as a final (in the current control processing cycle) desired value of a driving torque to be applied to the third joint 8 by the rotary actuator 9 via the power transmission system 10 by adding the crus compensating torque Tcor obtained by the crus compensating torque calculating means 64*c* to the basic desired torque Tcmd1 obtained by the basic desired torque calculating means 64*b*; a subtraction operation means 64*e* which obtains a deviation Terr (=Tcmd−Tact) between the desired joint torque Tcmd and the actual joint torque Tact obtained by the torque converting means 64*a*; a feedback operation means 64*f* which obtains a feedback manipulated variable Ifb of the indicator current value of the electric motor 15 required to cause the deviation Terr to be zero (make Tact match Tcmd); a feedforward operation means 64*g* which obtains a feedforward manipulated variable Iff of the indicator current value of the electric motor 15 required to cause the actual total lifting force share of the right leg link 3 to coincide with the leg link share desired value; and an addition operation means 64*h* which ultimately determines the indicator current value Icmd by adding up the feedback manipulated variable Ifb and the feedforward manipulated variable Iff.

The right indicator current determining means 64 first performs the processing of the torque converting means 64*a*, the basic desired torque calculating means 64*b*, and the crus compensating torque calculating means 64*c* as described below.

The torque converting means 64*a* receives an input of the measured value Frod of the rod transmitting force of the connecting rod 18 of the right power transmission system 10 and an input of the measured value $\theta1$ of the knee angle of the right leg link 3.

Where r is a distance between the joint axis of the third joint 8 in the direction perpendicular to the longitudinal direction of the connecting rod 18 (=the direction of the rod transmitting force) and the pivotally attached portion 18*b* of the connecting rod 18, a value obtained by multiplying the measured value Frod of the rod transmitting force by the distance r (hereinafter, referred to as "effective radius length r") is the actual joint torque Tact. The effective radius length r is determined according to a knee angle of the right leg link 3. Therefore, the torque converting means 64*a* obtains the effective radius length r from a preset arithmetic expression or data table (an arithmetic expression or data table representing the relationship between the knee angle and the effective radius length) on the basis of the input measured value $\theta1$ of the knee angle. The torque converting means 64*a* then obtains the actual joint torque Tact applied to the third joint 8 by the rod transmitting force of the measured value Frod by multiplying the input measured value Frod of the rod transmitting force by the obtained effective radius length r.

The processing of the torque converting means 64*a* is, in other words, arithmetic processing for calculating a vector product (outer product) of a vector of the rod transmitting force and a position vector of the pivotally attached portion 18*b* of the connecting rod 18 relative to the joint axis of the third joint 8.

Incidentally, in this embodiment, the driving torque applied to the third joint 8 by the rod transmitting force is used as the controlled variable of the present invention. Therefore, the actual joint torque Tact obtained by the torque converting means 64*a* as described above is equivalent to the measured value of the controlled variable.

Figure 9:
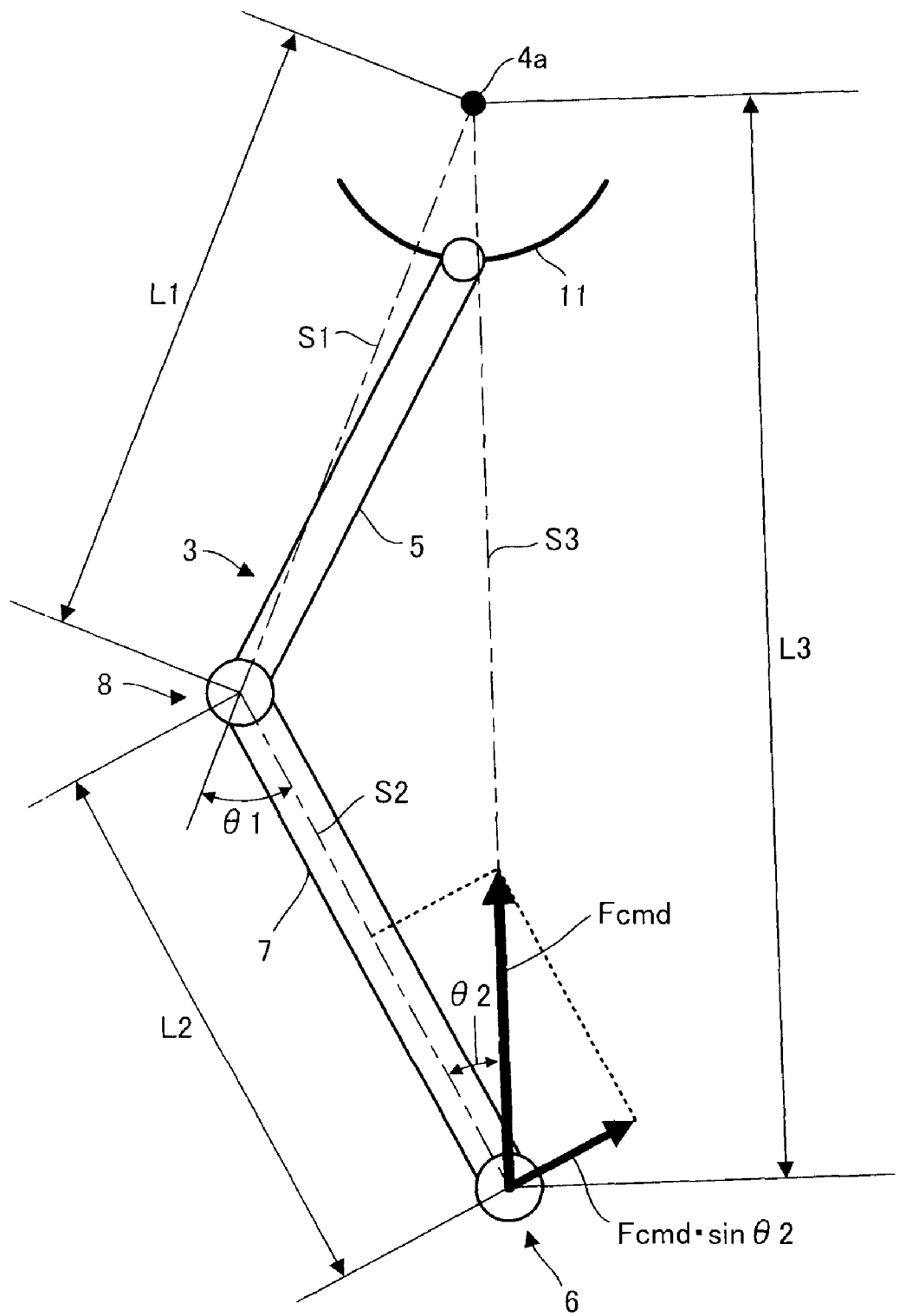
FIG. 9 is a diagram for describing processing of a basic desired torque calculating means shown in FIG. 8.

The basic desired torque calculating means 64*b* receives an input of the right leg link share desired value Fcmd determined by the left/right desired share determining means 63 and an input of the measured value $\theta1$ of the knee angle of the right leg link 3. The basic desired torque calculating means 64*b* then obtains the basic desired torque Tcmd1 from these input values as described below. This processing will be described hereinafter with reference to FIG. 9. FIG. 9 typically shows the construction of the essential part of the leg link 3.

Referring to FIG. 9, the supporting force acting on the leg link 3 via the second joint 6 from the floor side can be considered to be a translational force directed toward the center of curvature 4*a* of the guide rail 11 from the second joint 6, and the desired value of the magnitude of this translational force is the leg link share desired value Fcmd. On the assumption that the translational force (supporting force) of the magnitude of the leg link share desired value Fcmd acts on the leg link 3 from the floor side, a torque balanced with a moment generated around the joint axis of the third joint 8 by the translational force vector is the basic desired torque Tcmd1 to be obtained.

As shown, S1 denotes a line segment between the center of curvature 4*a* of the guide rail 11 and the third joint 8, S2 denotes a line segment between the third joint 8 and the second joint 6, and S3 denotes a line segment between the center of curvature 4*a* of the guide rail 11 and the second joint 6. Further, L1, L2, and L3 denote the lengths of S1, S2, and S3, respectively. Where $\theta2$ is an angle between the line segments S2 and S3, the following equation (1) is satisfied between the leg link share desired value Fcmd and the basic desired torque Tcmd1:

$$Tcmd1 = (Fcmd \cdot \sin\theta2) \cdot L2 \qquad (1)$$

where the right-hand side of equation (1) represents the magnitude of the moment generated around the joint axis of the third joint 8 by the translational force vector on the assumption that the translational force (supporting force) of the magnitude of the leg link share desired value Fcmd is applied to the leg link 3 from the floor side.

Accordingly, the basic desired torque calculating means 64*b* obtains the basic desired torque Tcmd1 by equation (1). In this case, the L2 value required for the calculation of the right-hand side of equation (1) is a constant value and previously stored in a memory which is not shown. Moreover, the angle $\theta2$ is obtained by a geometric calculation from the length L1 of the line segment S1, the length L2 of the line segment S2, and the input measured value $\theta1$ of the knee angle of the right leg link 3. The length L1 of the line segment S1 is a constant value similarly to the line segment L2 and is previously stored in the memory which is not shown.

More specifically, in a triangle having three sides of the line segments S1, S2, and S3, the following relational expressions (2) and (3) are satisfied:

$$L3^2 = L1^2 + L2^2 - 2 \cdot L1 \cdot L2 \cdot \cos(180° - \theta1) \qquad (2)$$

$$L1^2 = L2^2 + L3^2 - 2 \cdot L2 \cdot L3 \cdot \cos\theta2 \qquad (3)$$

Equation (2) enables the calculation of the length L3 from the L1 and L2 values and the measured value $\theta1$ of the knee angle. Further, equation (3) enables the calculation of the angle $\theta2$ from the calculated L3 value and the L1 and L2 values. The angle $\theta2$ is a function value of the knee angle, and therefore the relationship between the knee angle and the angle θ2 may be mapped in advance. In this instance, the basic desired torque Tcmd1 may be obtained by obtaining the angle θ2 on the basis of the map from the measured value θ1 of the knee angle and using the obtained angle θ2 for the calculation of equation (1).

The processing of the basic desired torque calculating means 64b has been described hereinabove. Incidentally, since the driving torque of the third joint 8 is used as a controlled variable of the present invention as described above in this embodiment, the basic desired torque calculating means 64b described above corresponds to the controlled variable basic desired value determining means of the present invention.

The crus compensating torque calculating means 64c receives an input of the measured value θ1 of the knee angle of the right leg link 3. Thereafter, the crus compensating torque calculating means 64c calculates the following model equation (4) by using the input measured value θ1 to obtain the crus compensating torque Tcor:

$$Tcor = A1 \cdot \theta1 + A2 \cdot sgn(\omega1) + A3 \cdot \omega1 + A4 \cdot \beta1 + A5 \cdot \sin(\theta1/2) \quad (4)$$

where ω1 in the right-hand side of equation (4) is a knee angular velocity as a time rate of change (derivative) of the knee angle of the right leg link 3, β1 is a knee angular acceleration as a time rate of change (derivative) of the knee angular velocity ω1, and sgn( ) is a sign function. Characters A1, A2, A3, A4, and A5 denote coefficients of predetermined values.

The first term in the right-hand side of equation (4) is used to decrease the desired joint torque Tcmd in the stretching direction of the leg link 3 from the basic desired torque Tcmd1 by the magnitude of the torque applied to the third joint 8 by means of a spring (not shown) biasing the right leg link 3 in the stretching direction. Moreover, the second term in the right-hand side represents a torque to be applied to the third joint 8 in order to drive the third joint 8 against a resistance force generated at the third joint 8 due to a frictional force (dynamic frictional force) between the thigh frame 5 and the crus frame 7 at the third joint 8 of the right leg link The third term in the right-hand side represents a torque to be applied to the third joint 8 in order to drive the third joint 8 against a viscous resistance between the thigh frame 5 and the crus frame 7 at the third joint 8 of the right leg link 3, namely a viscous resistance force according to the knee angular velocity ω1. Further, the fourth term in the right-hand side represents a torque to be applied to the third joint 8 in order to drive the third joint 8 against an inertial force moment generated according to the knee angular acceleration β1, more specifically a moment of the resistance force generated at the third joint 8 due to an inertial force caused by the motion of a part on the foot attachment portion 2 side from the third joint 8 of the right leg link 3 (a part composed of the crus frame 7, the second joint 6, and the foot attachment portion 2). Moreover, the fifth term in the right-hand side represents a torque to be applied to the third joint 8 in order to drive the third joint 8 against the moment of the resistance force generated at the third joint 3 due to the gravity acting on the part on the foot attachment portion 2 side from the third joint 8 of the right leg link 3 (the part composed of the crus frame 7, the second joint 6, and the foot attachment portion 2).

An angle to which the sine function sin( ) is to be applied in the fifth term is an angle between the line segment S2 (the line segment connecting the third joint 8 and the second joint 6) in FIG. 9 and the vertical direction (the gravity direction) under normal conditions. In this embodiment, the length of the thigh frame 5 is generally equal to the length of the crus frame 7 and therefore the angle between the line segment S2 and the vertical direction is approximately a half of the knee angle of the leg link 3 measured by the knee angle measuring means 61. Therefore, in this embodiment, an angle "θ1/2" is used as the angle to which the sine function sin( ) is applied in the fifth term. In cases, however, where an acceleration sensor or a tiltmeter is mounted on the walking assist device A so as to detect the angle of inclination of the crus frame 7 (the angle of inclination of the line segment S2) relative to the gravity direction, it is preferable to use the angle of inclination, instead of the angle "θ1/2" in the fifth term.

The crus compensating torque calculating means 64c sequentially calculates a value of the knee angular velocity ω1 and a value of the knee angular acceleration β1 required for the calculation of the right-hand side of the above equation (4) from the time series of the measured value θ1 of the knee angle of the right leg link 3 sequentially input from the right knee angle measuring means 61 in order to calculate the right-hand side of equation (4). Thereafter, the crus compensating torque calculating means 64c calculates the crus compensating torque Tcor by calculating the right-hand side of equation (4) using the input measured value θ1 of the knee angle of the right leg link 3 (the current value) and the calculated knee angular velocity θ1 value (the current value) and the knee angular acceleration β1 value (the current value). The term "current value" means a value obtained in the current control processing cycle of the arithmetic processing unit 51.

Additionally describing, the values of the coefficients A1, A2, A3, A4, and A5 used for the calculation of equation (4) are previously identified on an experimental basis by an identification algorithm for minimizing a square value of a difference between the value of the left-hand side (actual measurement) and the value of the right-hand side (calculated value) of equation (4) and then stored in a memory which is not shown.

The processing of the crus compensating torque calculating means 64c is as described above. The crus compensating torque Tcor obtained by the crus compensating torque calculating means 64c in this manner has a meaning of an additional correction amount for correcting the basic desired torque Tcmd1. Therefore, in this embodiment, the crus compensating torque calculating means 64c corresponds to the correction amount determining means of the present invention.

Model equation (4) is based on the premise that the walking assist device has the spring for biasing the leg link 3 in the stretching direction. In cases where the spring is omitted, however, the first term in the right-hand side of equation (4) is unnecessary. Moreover, generally the second term of the respective terms in the right-hard side of equation (4) has a relatively small value in comparison with other terms and therefore may be omitted. Further, the crus compensating torque Tcor may be determined by using a model equation in which a term having a relatively small value in comparison with other terms is omitted from the third, fourth, and fifth terms in the right-hand side of equation (4). For example, if the part on the foot attachment portion 2 side from the third joint 8 of the right leg link 3 is sufficiently lightweight, one or both of the fourth and fifth terms may be omitted.

After performing the processing of the torque converting means 64a, the basic desired torque calculating means 64b, and the crus compensating torque calculating means 64c as described above, the right indicator current determining means 64 performs the processing of the addition operation means 64d. In this processing, the addition operation means 64d adds up the basic desired torque Tcmd1 and the crus compensating torque Tcor obtained by the basic desired torque calculating means 64b and the crus compensating torque calculating means 64c, respectively. In other words, the basic desired torque Tcmd1 is corrected by means of the crus compensating torque Tcor. Thereby, the desired joint torque Tcmd (=Tcmd1+Tcor) is calculated.

The desired joint torque Tcmd calculated in this manner corresponds to the controlled variable desired value of the present invention. The desired joint torque Tcmd is, in other words, a desired value of the driving torque of the third joint 8 required for causing the desired lifting force to act on the user P from the seat member 1.

Incidentally, in this embodiment, the basic desired torque calculating means 64b, the crus compensating torque calculating means 64c, and the addition operation means 64d correspond to the controlled variable desired value setting means of the present invention.

The right indicator current determining means 64 further performs the processing of the subtraction operation means 64e. In this processing, the subtraction operation means 64e calculates a deviation Terr between the joint torques Tcmd and Tact (=Tcmd−Tact) by subtracting the actual joint torque Tact obtained by the torque converting means 64a from the desired joint torque Tcmd obtained by the addition operation means 64d.

Subsequently, the right indicator current determining means 64 performs the processing of the feedback operation means 64f. For this processing, the feedback operation means 64f receives an input of the deviation Terr. Then, the feedback operation means 64f calculates a feedback manipulated variable Ifb as a feedback component of the indicator current value Icmd according to a predetermined feedback control law from the input deviation Terr. As the feedback control law, for example, a proportional-derivative (PD) law is used. In this instance, the feedback manipulated variable Ifb is calculated by adding up a value obtained by multiplying the deviation Terr by a predetermined gain Kp (proportional term) and a derivative of multiplication between the deviation Terr and a predetermined gain Kd (derivative term). In this embodiment, the sensitivity to change of the lifting force of the seat member 1 in response to change in current of the electric motor 15 (change in the output torque) varies according to the knee angle of the leg link 3. Therefore, in this embodiment, the feedback operation means 64f receives an input of the measured value θ1 of the knee angle of the right leg link 3 in addition to the deviation Terr. The feedback operation means 64f then variably sets the values of the gains Kp and Kd of the proportional term and the derivative term described above according to the measured value θ1 of the knee angle of the right leg link 3 based on a predetermined data table which is not shown (a data table representing a relationship between the knee angle and the gains Kp and Kd).

On the other hand, the right indicator current determining means 64 performs the processing of the feedforward operation means 64g in parallel with the processing of the feedback operation means 64f. In this case, the feedforward operation means 64g receives an input of the right leg link share desired value Fcmd determined by the left/right desired share determining means 63 and an input of the measured value θ1 of the knee angle of the right leg link 3.

Thereafter, the feedforward operation means 64g calculates a feedforward manipulated variable Iff as a feedforward component of the indicator current value of the electric motor 15 by the following model equation (5):

$$Iff = B1 \cdot Tcmd1 + B2 \cdot \omega1 + B3 \cdot sgn(\omega1) + B4 \cdot \beta1 + B5 \cdot \theta1 \quad (5)$$

where Tcmd1 in the right-hand side of equation (5) is the same as the basic desired torque Tcmd1 obtained by the basic desired torque calculating means 64b. In addition, ω1 and β1 are the knee angular velocity and the knee angular acceleration, respectively, as described above with respect to equation (4). Moreover, characters B1, B2, B3, and B4 are coefficients of predetermined values.

The first term in the right-hand side of equation (5) represents a basic requested value of an applied current of the electric motor 15, which is requested to provide the third joint 8 of the right leg link 3 with a driving torque balanced with the moment generated around the joint axis of the third joint 8, on the assumption that the driving torque of the basic desired torque Tcmd1, that is, the supporting force of the right leg link share desired value Fcmd acts on the right leg link 3 from the floor side. Further, the second term in the right-hand side represents a component of applied current of the electric motor 15, which is requested to provide the third joint 8 with a driving torque against a viscous resistance between the thigh frame 5 and the crus frame 7 at the third joint 8 of the right leg link 3, that is, a viscous resistance force between the thigh frame 5 and the crus frame 7 generated according to the knee angular velocity ω1. The third term in the right-hand side represents a component of applied current of the electric motor 15, which is requested to provide the third joint 8 with a driving torque against a dynamic frictional force between the thigh frame 5 and the crus frame 7 at the third joint 8 of the right leg link 3. Moreover, the fourth term in the right-hand side represents a component of applied current of the electric motor 15, which is requested to provide the third joint 8 with a driving torque against an inertial force moment generated according to the knee angular acceleration β1. Further, the fifth term in the right-hand side is used to decrease the applied current of the electric motor 15 generating a driving torque in the stretching direction of the leg link 3 by the magnitude of the torque applied to the third joint 8 by a spring (not shown) for biasing the right leg link 3 in the stretching direction.

In this case, the feedforward operation means 64g calculates the knee angular velocity ω1 and the knee angular acceleration β1 necessary for the calculation of the right-hand side of equation (5) from the time series of the input measured value θ1 of the knee angle of the right leg link 3 similarly to the processing of the crus compensating torque calculating means 64c. Further, the feedforward operation means 64g calculates the basic desired torque Tcmd1 necessary for the calculation of the right-hard side of equation (5) from the input right leg link share desired value Fcmd and the measured value θ1 of the knee angle by the same arithmetic processing as in the basic desired torque calculating means 64b. Thereafter, the feedforward operation means 64g calculates the feedforward manipulated variable Iff by calculating the right-hard side of equation (5) using the input measured value θ1 (the current value) of the knee angle of the right leg link 3, the calculated value (the current value) of the knee angular velocity ω1, the calculated value (the current value) of the knee angular acceleration β1, and the calculated value (the current value) of the basic desired torque Tcmd1.

Additionally describing, the values of the coefficients B1, B2, B3, B4, and B5 used for the calculation of equation (5) are previously identified on an experimental basis by an identification algorithm for minimizing a square value of a difference between the value of the left-hand side (actual measurement) and the value of the right-hand side (calculated value) of equation (5) and then stored in a memory which is not shown. The model equation (5) is based on the premise that the walking assist device has the spring for biasing the leg link 3 in the stretching direction. In cases where the spring is omitted, however, the fifth term in the right-hand side of equation (5) is unnecessary. Further, the feedforward manipulated variable Iff may be determined by using a model equation in which, for example, the second or fourth term is omitted from the terms of the right-hand side of equation (5). Moreover, the feedforward operation means 64g may accept an input of the basic desired torque Tcmd1 calculated by the basic desired torque calculating means 64b, instead of the input of the leg link share desired value Fcmd. In this case, there is no need to calculate the basic desired torque Tcmd1 by the feedforward operation means 64g.

After completion of the processing of the feedback operation means 64f and the feedforward operation means 64g as described above, the indicator current determining means 64 performs the processing of the addition operation means 64h. In this processing, the addition operation means 64h adds up the feedback manipulated variable Ifb and the feedforward manipulated variable Iff obtained by the feedback operation means 64f and the feedforward operation means 64g, respectively. This allows the calculation of the indicator current value Icmd of the right electric motor 15.

The processing of the right indicator current determining means 64R has been described in detail hereinabove. The processing of the left indicator current determining means 64L is performed in the same manner.

In this embodiment, the indicator current determining means 64R and 64L described above corresponds to the actuator control means of the present invention.

The arithmetic processing unit 51 outputs the indicator current values Icmd_R and Icmd_L determined by the indicator current determining means 64R and 64L as described above to the driver circuits 52R and 52L corresponding to the electric motors 15R and 15L. The driver circuits 52 then apply power to the electric motors 15 according to the given indicator current values Icmd, respectively.

The control processing of the arithmetic processing unit 51 described above is performed at predetermined control processing cycles. This causes the feedback control of the output torque of each electric motor 15 and consequently the driving torque applied to the third joint 8 of each leg link 3 so that the actual joint torque Tact of each leg link 3 coincides with (is converged to) the desired joint torque Tcmd. As a result, the desired lifting force (the translational force capable of supporting a part of the weight of the user P) acts on the user P from the seat member 1, thereby reducing the load on the leg of the user P.

In this case, the magnitude of the rod transmitting force of the connecting rod 18 of each power transmission system 10 is the highest when the driving torque for biasing the leg link 3 in the stretching direction is applied to the third joint 8. The magnitude, however, is sufficiently low in comparison with the supporting force acting on the leg link 3 from the floor side. Moreover, when the leg link 3 is biased in the stretching direction, the rod transmitting force acting on the connecting rod 18 is a tractive force. Therefore, the connecting rod 18 is less apt to be deformed. Consequently, the connecting rod 18 is less apt to be subjected to a force in directions other than the longitudinal direction of the connecting rod 18, such as in the transverse (shear) direction of the connecting rod 18. Moreover, the range of the magnitude of the rod transmitting force is sufficiently small in comparison with the range of the magnitude of the supporting force acting on each leg link 3 from the floor side. Further, the strain gauge force sensor 23 has sufficiently low sensitivity to forces in directions other than the longitudinal direction of the connecting rod 18 in comparison with the force in the longitudinal direction.

Therefore, each rod transmitting force measuring means 62 is able to accurately and stably measure the rod transmitting force in the longitudinal direction of the connecting rod 18, that is, the rod transmitting force for generating the driving torque of the third joint 8 on the basis of an output of the strain gauge force sensor 23. The arithmetic processing unit 51 then feedbacks the measured value Frod of the rod transmitting force to control an output torque of the electric motor 15. This allows the driving torque applied to the third joint 8 by the rotary actuator 9 to be stably controlled to the desired joint torque Tcmd that enables the desired lifting force to act on the user P from the seat member 1.

Moreover, in this embodiment, the desired joint torque Tcmd is determined by adding the crus compensating torque Tcor to the basic desired torque Tcmd1 in consideration of the frictional force and the inertial force moment at the third joint 8. Accordingly, it is possible to prevent the user P from feeling uncomfortable in moving the foot attachment portion 2 in the air.

The following describes some variations of this embodiment.

Although the driving torque of the third joint 8 is used as a controlled variable of the present invention in this embodiment, the rod transmitting force may be used as the controlled variable. In this case, for example, it is possible to convert the desired joint torque Tcmd determined as described above to a desired value of the rod transmitting force by processing (processing of dividing the desired joint torque Tcmd by the effective radius length r) reverse to the processing of the torque converting means 64a. The output torque of the electric motor 15 is then controlled so that the measured value Frod of the rod transmitting force coincides with the desired value of the rod transmitting force. More specifically, for example, a feedback manipulated variable of the indicator current value of the electric motor 15 is determined according to the feedback control law such as the PD control law from a deviation between the desired value of the rod transmitting force and the measured value Frod. Thereafter, the feedback manipulated variable is used instead of the feedback manipulated variable Ifb in this embodiment to determine the indicator current value Icmd in the same manner as in the above embodiment.

If the frictional force or the inertial force moment at the third joint 8 is sufficiently small, the crus compensating torque calculating means 64c may be omitted. In this case, the basic desired torque Tcmd1 may be directly used as the desired joint torque Tcmd. Thereby, one embodiment of the fourth aspect of the invention is formed.

Although the leg link share desired value Fcmd is determined before the basic desired torque Tcmd1 is determined in this embodiment, the basic desired torque Tcmd1 (or a desired value of the rod transmitting force corresponding to the basic desired torque Tcmd1) may be determined as described below. Specifically, for example, with respect to the right basic desired torque Tcmd1_R, mapping is previously designed for the relationship between input items and the basic desired torque Tcmd1_R on the assumption that the input items are a desired value of the total lifting force, a right distribution ratio, and a knee angle of the right leg link 3R. Thereafter, the basic desired torque Tcmd1_R is obtained based on the above map from the desired value of the total lifting force, the set value of the right distribution ratio, and the measured value $\theta 1\_R$ of the knee angle of the right leg link 3R. The same applies to the left basic desired torque Tcmd1_L. In this process, there is no need to determine the leg link share desired value Fcmd.

Moreover, in cases where the usage pattern of the walking assist device A is limited to a relatively slow motion of the legs of the user P, the feedforward operation means 64g may be omitted to determine the indicator current value Icmd of each electric motor 15 according to the feedback control law such as the PID law on the basis of the deviation Terr between the desired joint torque Tcmd and the actual joint torque Tact (or a deviation between the desired value and the measured value of the rod transmitting force).

Further, instead of securing the strain gauge force sensor 23 to the connecting rod 18, for example, a pressure sensor may be interposed as a rod transmitting force measurement force sensor between the connecting rod 18 and the driven crank arm 17 so that the connecting rod 18 is pivotally attached to the driven crank arm 17 via the pressure sensor.

What is claimed is:

1. A walking assist device comprising: a lifting force transmitting portion which is put in contact with the trunk of a user so as to allow an upward lifting force to be applied to the trunk of the user; a pair of left and right foot attachment portions fitted to the feet of the legs of the user; and a pair of left and right leg links connecting the foot attachment portions to the lifting force transmitting portion, respectively, each of the leg links including a thigh frame extending from the lifting force transmitting portion via a first joint, a crus frame extending from each foot attachment portion via a second joint, and a third joint that interconnects the thigh frame and the crus frame so that the frames freely bend and stretch and each of the leg links being provided with a rotary actuator mounted on the thigh frame and with a power transmission system which transmits a driving force of the rotary actuator to the third joint to apply a driving torque around a joint axis of the third joint thereto, wherein the power transmission system includes a driving crank arm fixed coaxially with an output shaft of the rotary actuator, a driven crank arm fixed to the crus frame coaxially with the joint axis of the third joint, and a connecting rod pivotally attached to the driving crank arm and to the driven crank arm at one end and the other end; and wherein each of the leg links includes:

a rod transmitting force measuring means which measures a rod transmitting force, which is a translational force acting on the connecting rod in a longitudinal direction thereof according to the driving force of the rotary actuator, on the basis of an output of a rod transmitting force measurement force sensor fixed to the connecting rod;

a controlled variable desired value setting means which sets a controlled variable desired value that is a desired value of a controlled variable requested to control the lifting force to a desired lifting force, where the controlled variable is one of the rod transmitting force and the driving torque applied to the third joint by the rod transmitting force; and an actuator control means which feedback-controls the driving force of the rotary actuator according to a value of the rod transmitting force measured by the rod transmitting force measuring means and the set controlled variable desired value so that the controlled variable coincides with the controlled variable desired value set by the controlled variable desired value setting means.

2. The walking assist device according to claim 1, wherein the rod transmitting force measurement force sensor is a strain gauge force sensor secured to the connecting rod.

3. The walking assist device according to claim 1, wherein, in cases where the driving torque applied to the third joint of each leg link is a driving torque in a direction of biasing the leg link in the stretching direction, the connecting rod is pivotally attached to the driving crank arm and to the driven crank arm at one end and the other end, respectively, so that the rod transmitting force acting on the connecting rod is a tractive force in the longitudinal direction of the connecting rod.

4. The walking assist device according to claim 1, further comprising:

a desired supporting force setting means which sets a desired supporting force which is a desired value of a supporting force to be applied to each leg link from the floor side in order to control the lifting force to a desired lifting force; and a joint angle measuring means which measures a displacement angle of the third joint of the leg link, wherein the controlled variable desired value setting means defines the controlled variable desired value as a value of the controlled variable, which is requested to provide the third joint of the leg link with a torque balanced with a moment applied to the third joint of the leg link by the desired supporting force, on the assumption that the desired supporting force set by the desired supporting force setting means is applied to the leg link from the floor side, and determines the controlled variable desired value on the basis of the set desired supporting force and the value of the displacement angle of the third joint measured by the joint angle measuring means for each leg link.

5. The walking assist device according to claim 1, further comprising:

a desired supporting force setting means which sets a desired supporting force which is a desired value of a supporting force to be applied to each leg link from the floor side in order to control the lifting force to a desired lifting force;

a joint angle measuring means which measures a displacement angle of the third joint of the leg link;

a controlled variable basic desired value determining means which defines a basic value of the controlled variable desired value as a value of the controlled variable requested to provide the third joint of the leg link with a torque balanced with a moment applied to the third joint of the leg link by the desired supporting force, on the assumption that the desired supporting force set by the desired supporting force setting means is applied to the leg link from the floor side, and determines the basic value on the basis of the set desired supporting force and the value of the displacement angle of the third joint measured by the joint angle measuring means; and a correction amount determining means which determines an additional correction amount including a correction amount of the basic value requested to provide the third joint of the leg link with a torque against at least one of a resistance force generated at the third joint of the leg link due to a frictional force at the third joint of the leg link, a resistance force generated at the third joint of the leg link due to an inertial force caused by a motion of a part on the foot attachment portion side from the third joint of the leg link, and a resistance force generated at the third joint of the leg link due to a gravity acting on the part on the foot attachment portion side from the third joint of the leg link, on the basis of the value of the displacement angle of the third joint measured by the joint angle measuring means, wherein the controlled variable desired value setting means determines the controlled variable desired value by correcting the basic value determined by the controlled variable basic desired value determining means with the additional correction amount determined by the correction amount determining means for each leg link.

* * * * *